(12) United States Patent
Inoue et al.

(10) Patent No.: US 7,503,039 B2
(45) Date of Patent: Mar. 10, 2009

(54) PREPROCESSOR TO IMPROVE THE PERFORMANCE OF MESSAGE-PASSING-BASED PARALLEL PROGRAMS ON VIRTUALIZED MULTI-CORE PROCESSORS

(75) Inventors: Hiroshi Inoue, Yokohama (JP); Hideaki Komatsu, Yokohama (JP); Takao Moriyama, Kanagawa-ken (JP); Moriyoshi Ohara, Yokohama (JP); Yukihiko Sohda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/463,496

(22) Filed: Aug. 9, 2006

(65) Prior Publication Data

US 2007/0038987 A1 Feb. 15, 2007

(30) Foreign Application Priority Data

Aug. 10, 2005 (JP) .............................. 2005-232085

(51) Int. Cl.
G06F 9/45 (2006.01)
G06F 9/46 (2006.01)
(52) U.S. Cl. .................. 717/154; 717/151; 718/102
(58) Field of Classification Search ................ 717/140, 717/151–157, 159–161; 709/201–203; 718/1, 718/100–108
See application file for complete search history.

(56) References Cited

OTHER PUBLICATIONS

Ahmad et al., "On Parallelizing the Multiprocessor Scheduling Problem", IEEE Transactions on Parallel and Distributed Systems, vol. 10, No. 4, Apr. 1999, pp. 414-432.*

A. Gonzalez Escribano, A.J.C. Van Gemund, and V. Cardenoso-Payo, "Mapping Unstructured Applications into Nested Parallelism," Proceedings of VECPAR 2002—5th International Conference on High Performance Computing for Computational Science, LNCS 2565, pp. 407-420 2003.

H. Ogawa and S. Matsuoka, "OMPI: optimizing MPI programs using partial evaluation," Proceedings of the 1996 ACM/IEEE conference on Supercomputing, pp. 1-18, Nov. 1996.

Y. Kwok and I. Ashmad, "Static Scheduling Algorithms for Allocating Directed Task Graphs to Multiprocessors," ACM Computing Surveys, vol. 31, No. 4, pp. 1-66, Dec. 1999.

(Continued)

*Primary Examiner*—William H Wood
(74) *Attorney, Agent, or Firm*—Ido Tuchman; Lisa M. Yamonaco

(57) ABSTRACT

Provided is a complier which optimizes parallel processing. The complier records the number of execution cores, which is the number of processor cores that execute a target program. First, the compiler detects a dominant path, which is a candidate of an execution path to be consecutively executed by a single processor core, from a target program. Subsequently, the compiler selects dominant paths with the number not larger than the number of execution cores, and generates clusters of tasks to be executed by a multi-core processor in parallel or consecutively. After that, the compiler computes an execution time for which each of the generated clusters is executed by the processor cores with the number equal to one or each of a plurality natural numbers selected from the natural numbers not larger than the number of execution cores. Then, the compiler selects the number of processor cores to be assigned for execution of each of the clusters based on the computed execution time.

13 Claims, 18 Drawing Sheets

OTHER PUBLICATIONS

Lucian Finta, Zhen Liu, Ioannis Milis, and Evripidis Bampis, "Scheduling UET-UCT Series-Parallel Graphs on Two Processors" Rapport de recherche No. 2566, pp. 1-27, May 1995.

C.L.McCreary and S.S. Roth, Incremental Graph Parsing, Department of Computer Science and Engineering, pp. 1-11, 1994.

Printout of http://www-unix.mcs.anl.gov/mpl/mpich/ on Aug. 9, 2006, pp. 1-3.

Printout of http://www.lam-mpi.org on Aug. 9, 2006, pp. 1-2.

Printout of http://www.csm.ornl.gov/pvm/pvm_home.html on Aug. 9, 2006, pp. 1-6.

* cited by examiner

15

```
1:  Gaussian Elimination ()
2:  {
3:      if (my_task_id == 0)  { // I am a support task T0
4:          Send a set of row factors to each task;
5:          Receive a solution element from each task;
6:      } else {
7:          // initialization part
8:          Receive a set of row factors from the support task T0;
9:          // elimination part
10:         for (row = 1; row < N; row++)  {
11:             if (my_task_id) > row)  {
12:                 Receive row elements from task Trow;
13:                 Update my local row elements ;
14:             } else if (my_task_id == row)  {
15:                 for (taskid = row+1; taskid <= N; taskid++)
16:                     send my row elements to task Ttaskid;
17:             }
18:         }
19:         // solving part
20:         for (row = N; row > my_task_id; row--)
21:             Receive a solution element Xrow from task Trow;
22:         Compute a solution element Xmy_task_id;
23:         for (row = my_task_id-1; row >= 0; row--)
24:             Send Xmy_task_id to task Trow;
25:             // the last iteration sends Xmy_task_id to the support task
26:     }
27: }
```

| DATA TRANSFER CONDITION | CONTEXT TRANSFER CONDITION | DATA TRANSFER TIME | CONTEXT TRANSFER TIME |
|---|---|---|---|
| SAME PROCESSOR CONSECUTIVE EXECUTION | SAME TASK | COPY BETWEEN LOCAL MEMORIES | ZERO |
| | SAME EXECUTION CODE DIFFERENT TASK | COPY BETWEEN LOCAL MEMORIES | SAVE AND RETURN OF CONTEXT |
| | DIFFERENT EXECUTION CODE DIFFERENT TASK | COPY BETWEEN LOCAL MEMORIES | SAVE AND RETURN OF CONTEXT AND EXECUTION CODE |
| DIFFERENT PROCESSOR OR NON-CONSECUTIVE EXECUTION | | SAVE AND RETURN TO MAIN MEMORY | |

(b)

| NUMBER OF EXECUTION CORES |
|---|
| 7 |

FIG. 6

(a)
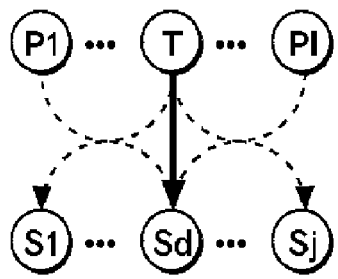
max Save(T, Si)=Save(T, Sd)
1<=i<=j
(b)
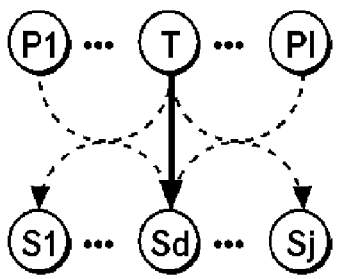
max Save(Pi, Sd)=Save(Pd, Sd)
1<=i<=l
   =Save(T, Sd)
(c)
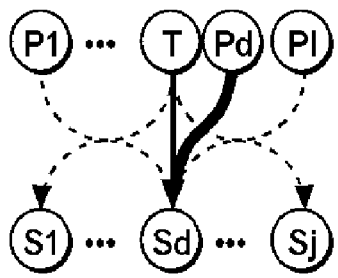
max Save(Pi, Sd)=Save(Pd, Sd)
1<=i<=l
   >Save(T, Sd)
FIG. 12

PREPROCESSOR TO IMPROVE THE PERFORMANCE OF MESSAGE-PASSING-BASED PARALLEL PROGRAMS ON VIRTUALIZED MULTI-CORE PROCESSORS

CROSS-REFERENCE TO RELATED APPLICATIONS

This application claims priority under 35 U.S.C. § 119 to Japanese Patent Application No. 2005-232085 filed Aug. 10, 2005, the entire text of which is specifically incorporated by reference herein.

BACKGROUND OF THE INVENTION

The present invention relates to a compiler, control method, and compiler program. Particularly, the present invention relates to a compiler, control method, and compiler program which optimize a program by processing a plurality of tasks in parallel.

In recent years, there have been developed microprocessors including a plurality of processor cores. Each of the processor cores can perform operation interdependently from another processor core and can perform operation in parallel with another processor core. For example, POWER5 processor developed by the applicant of the present invention includes two processor cores, which can be operated in parallel. In addition, CELL BE processor developed by the applicant of the present invention includes eight processor cores, which can be operated in parallel.

FIG. 1 shows a configuration of a distributed memory type multi-core microprocessor 10. The microprocessor 10 includes processor cores 100-1 to 100-N, local memories 110 and DMA engines 120, the latter two of which correspond to the respective processor cores. The respective processor cores 100-1 to 100-N are connected with each other by a common on-chip bus 140. Moreover, the processor cores 100-1 to 100-N are connected to a main memory 1020 through an off-chip bus 150.

The processor core 100-1 reads a program from the local memory 110-1 to execute the program, and access data in the local memory 110-1 to advance processing. A processing result is outputted to the main memory 1020 at a predetermined timing. Here, similar to the conventional cache memory, the local memory 110-1 can be accessed at an extremely high speed as compared with the main memory 1020. Moreover, the on-chip bus 140 enables extremely high-speed commutations between the local memories 110-1 to 110-N as compared with communications via an off-chip bus 150.

In such the multi-core microprocessor, the performance of the entire processing largely differs depending on which task is executed in what order by each of the processor cores. This is because the storage capacity of each of the local memories 110-1 to 110-N is extremely small as compared with the main memory 1020. In other words, when a certain processing result of a first task is not used in a next second task, the processing result cannot be stored in the local memory and must be saved in the main memory 1020 so as to be used later.

Accordingly, for example, a second task using a processing result of a certain first task is preferably executed consecutively after the first task by the same processor core. Moreover, a third task using processing process of the first task during processing of the first task is preferably executed in parallel by the other processor core during the processing of the first task. Conventionally, there has not been proposed the technique for determining an efficient task execution order in a system by making use of the characteristic of the above-mentioned distributed memory type multi-core microprocessor.

Additionally, as reference techniques, there have been proposed techniques for efficiently executing the multiple tasks by each processor in the distributed memory type multiprocessor. For example, Y. Kwok and I. Ashmad compare and discuss algorithms for efficiently executing an entire program by analyzing a graph illustrating interdependency relations among the multiple tasks (refer to Y. Kwok and I. Ashmad. "Static Scheduling Algorithms for Allocating Directed Task Graphs to Multiprocessors," ACM Computing Surveys, Vol. 31, No. 4, December 1999).

In a system including existing general multiprocessors, the processors can access the high-capacity memory at a high speed. In contrast to this, the communication rate between the processors is low. Accordingly, multiple tasks, which frequently communicate with each other, are executed by the same processor to reduce communication traffic volumes occurring therebetween. As a result, in some cases frequent task switching is needed in the same processor.

On the other hand, in the multi-core processors, multiple processor cores can communicate with each other at a high speed. However, in a case of executing different tasks consecutively by the same processor core, processing efficiency is reduced due to an occurrence of access to the main memory. To be more precise, since the local memory is not sufficiently large, the context of the previous task must be save to the main memory from the local memory and the context of a next task must be loaded onto the local memory from the main memory.

As mentioned above, the system including the multiprocessor and the multi-core processor are largely different in features and the techniques relating to the multiprocessor cannot be directly applied to the multi-core processor.

Moreover, as another reference technique, there has been proposed the technique for generating a series-parallel graph in which a group of tasks is combined into a cluster, and an interdependency relation between the clusters is indicated (refer to A. Gonzalez Escribano, A. J. C. van Gemund, and V. Cardenoso-Payo, "Mapping Unstructured Applications into Nested Parallelism," Proceedings of VECPAR 2002—5th International Conference on High Performance Computing for Computational Science, LNCS 2565, 2003, pp. 407-420). However, in this technique, the information on a time required for execution of each cluster, a time required for communication between the clusters, or other is not used in generation of the graph. Furthermore, although there has been proposed the technique for scheduling the clusters based on the graph (refer to P. Chretienne and C. Picouleau, "Scheduling with communication delays: a survey," In P. Chretienne, E. G. Coffman Jr., J. K. Lenstra, and Z. Liu, editors, Scheduling Theory and its Applications, chapter 4, pp. 65-90, John Wiley & Sons, 1995), in this method, it is assumed that an infinite number of processors is used. In other words, with these techniques, efficient scheduling is not performed by the distributed memory type multi-core processor.

Moreover, in order to apply a dynamic programming efficiently, it is necessary that an optimal solution of a whole problem be composed of a sum of optimal solutions of partial problems. More specifically, an execution time, at which each of the clusters is independently executed, has to coincide with an execution time, at which a certain cluster is executed when the certain cluster and another cluster are executed in parallel or in succession. In the multi-core processor, regarding execution efficiency with which a certain task is executed, processing efficiency largely differs depending on the other task, which is executed in parallel or in succession with the certain task. Accordingly, it is difficult to apply this technique directly.

Furthermore, MPI (Message Passing Interface) and PVM (Parallel Virtual Machine) are used as other reference techniques (refer to MPICH, http://www-unix.mcs.anl.gov/mpi/mpich/; LAM-MPI, http://www.lam-mpi.org; PVM, http://www.csm.ornl.gov/pvm/pvm_home.html; H. Ogawa and S. Matsuoka, "OMPI: optimizing MPI programs using partial evaluation," Proceedings of the 1996 ACM/IEEE conference on Supercomputing, November 1996). According to these techniques, in the system including the distributed memory type multiprocessor, an application program can be efficiently operated in parallel. However, these techniques do not provide a function of statically analyzing the interdependency relation among the tasks and a function of analyzing the communication traffic volumes for which the respective tasks communicate with each other.

BRIEF SUMMARY OF THE INVENTION

In order to solve the aforementioned problem, according to a first aspect of the present invention, there are provided a compiler apparatus optimizing execution of a target program to be compiled by a multi-core processor, a compile method using the compiler, and a compiler program causing an information processing system to function as the compiler. The compiler includes a recording section which records the number of execution cores, which is the number of processor cores for execution of the target program among processor cores provided in the multi-core processor; a path detecting section for detecting a dominant path, which is a candidate of an execution path of one or more tasks to be consecutively executed by a single processor core, from the target program; a cluster generating section which selects dominant paths with the number not larger than the number of the execution cores and which generates a cluster of tasks to be executed by a multi-core processor in parallel or in succession; a time computing section which computes execution times at which each of the generated clusters is executed by the processor cores with the number equal to one or each of a plurality of natural numbers selected from the natural numbers not larger than the number of the execution cores; and a core number selecting section which selects the number of processor cores to be assigned for the execution of each of the generated clusters based on the computed execution times to reduce an execution time of the target program.

Moreover, according to a second aspect of the present invention, there are provided a compiler apparatus for detecting a dominant path, which is a candidate of an execution path of one or more tasks to be consecutively executed by a same processor core, from a target program to be compiled, a compile method using the compiler; and a compiler program causing an information processing system to function as the compiler. The compiler includes a task selecting section which selects at least one second task of a first task in the target program, the second task depending on a processing result of the first task; a reduced amount computing section which computes a reduced amount of a task switching time to be reduced when the second task is executed after the first task by the same processor core in comparison with a task switching time when the first task and the selected second task are executed by different processor cores; and a path detecting section for detecting a second task and the first task inclusive in the dominant path, the second task having a maximum reduced amount to be computed.

It is noted that the above summary of the invention does not enumerate all of the features necessary to the present invention, and that sub-combinations of these feature groups may be included in the invention.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

FIG. 4 shows an example of a target program 15.

FIG. 6 shows an example of a data structure of a performance information recording unit 505.

FIG. 12 shows a specific example of processing for detecting dominant paths.

DETAILED DESCRIPTION OF THE INVENTION

Figure 1:
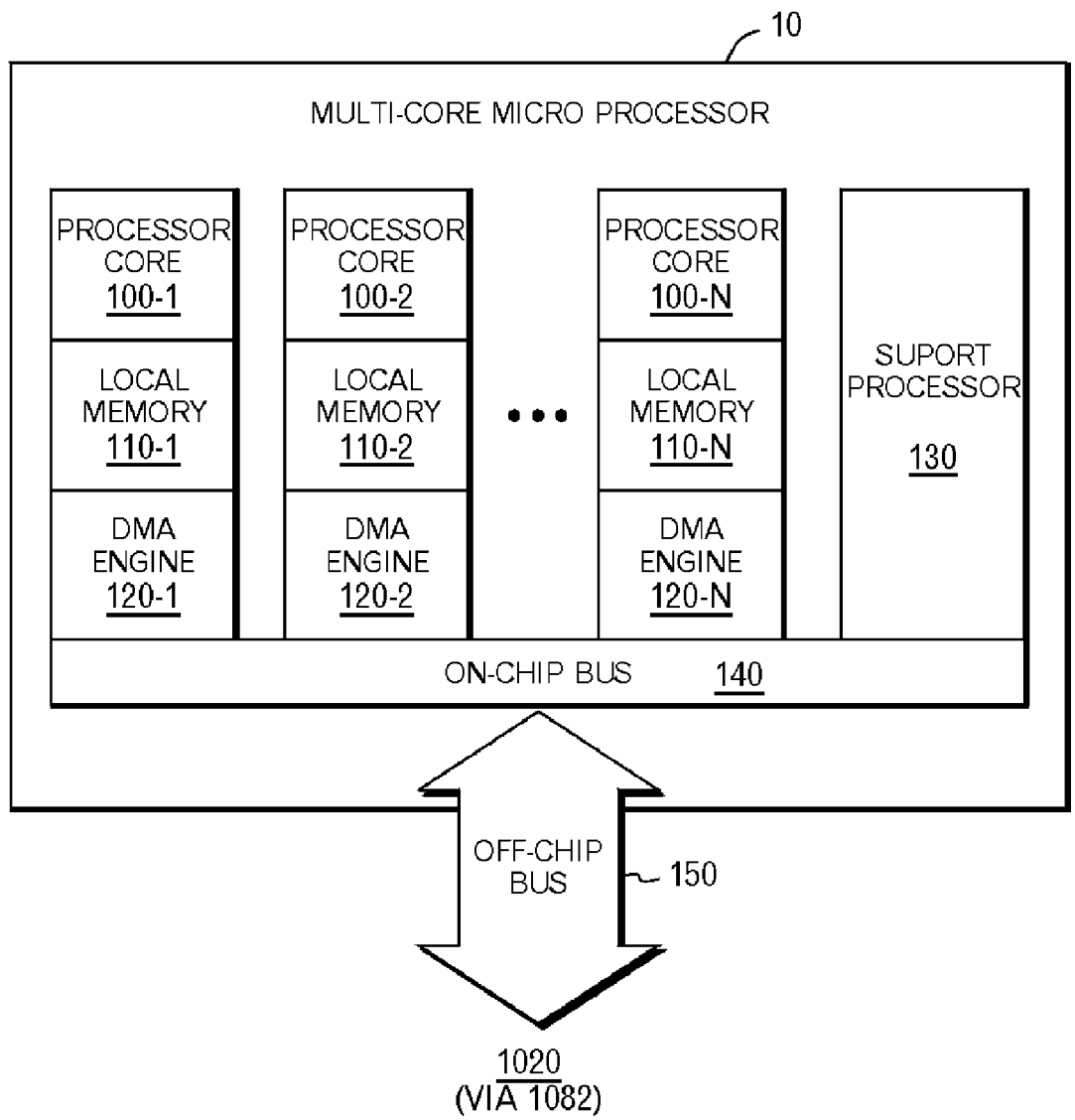
FIG. 1 shows a configuration of a distributed memory type multi-core processor 10.

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 2:
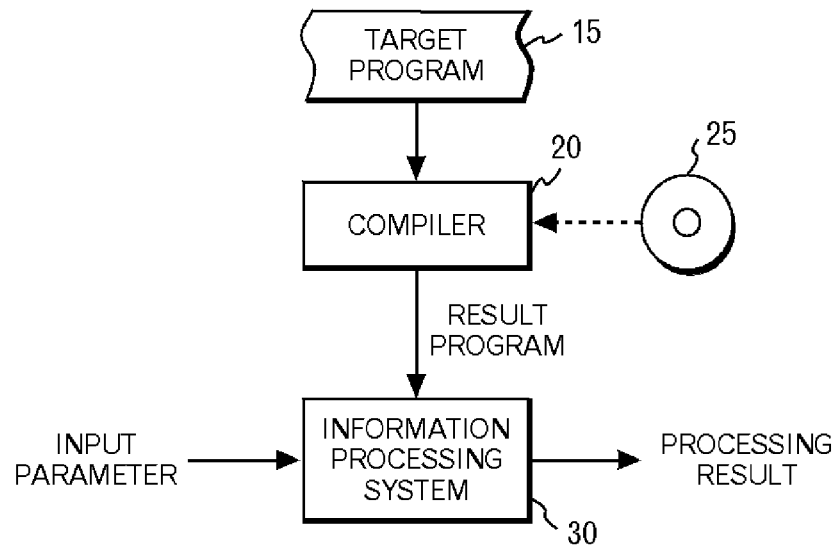
FIG. 2 shows a general configuration of a compiler 20 and an information processing system 30.

FIG. 2 shows a general configuration of a compiler 20 and an information processing system 30. A target program 15 is inputted in the compiler 20, and optimized so as to be executed by a multi-core processor such as a processor 10. A result program, which is an optimized result, is executed by the information processing system 30. For example, an input parameter is inputted to the result program in the information processing system 30, and the result program is executed to output the processing result.

Figure 3:
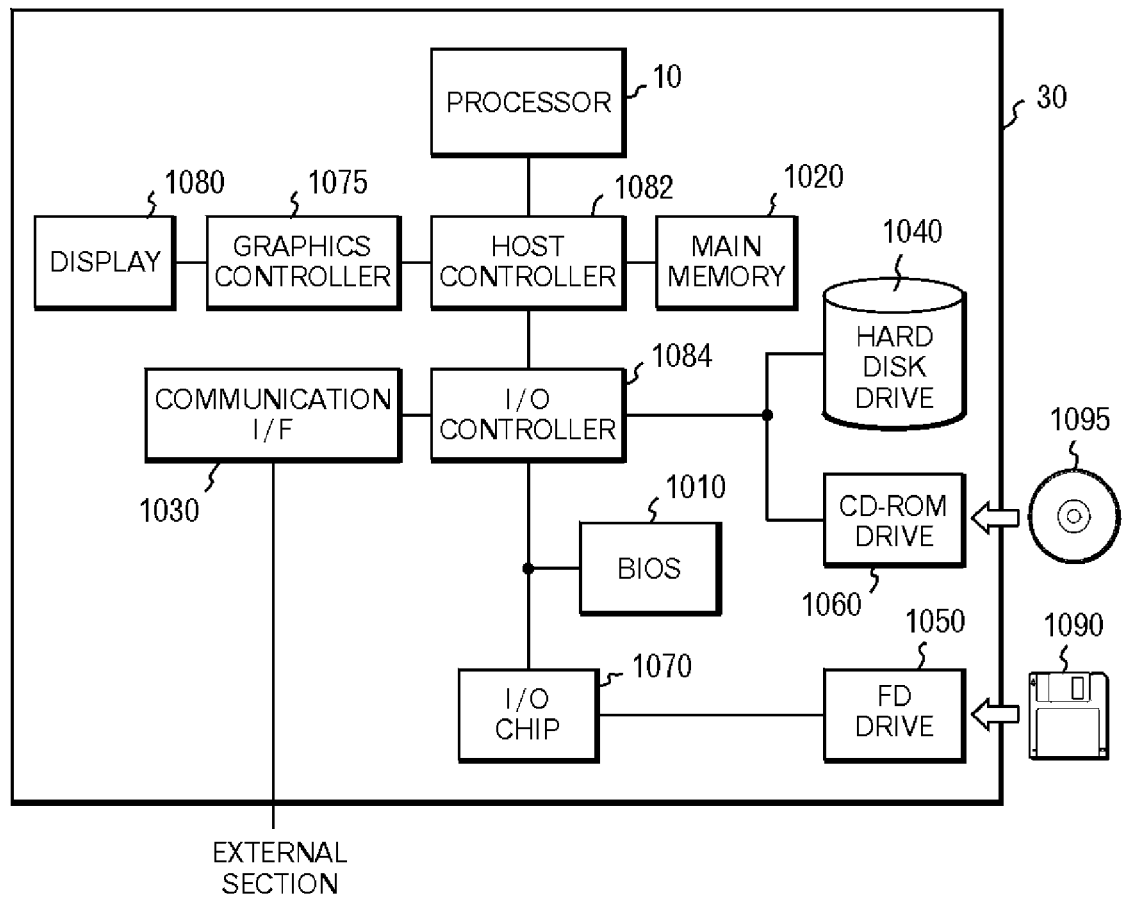
FIG. 3 shows an example of a hardware configuration of the information processing system 30.

FIG. 3 shows an example of a hardware configuration of the information processing system 30. The information processing system 30 includes a CPU peripheral unit having a processor 10, a main memory 1020, and a graphics controller 1075, all of which are mutually connected to one another through a host controller 1082; an input/output unit having a communication interface 1030, a hard disk drive 1040, and a CD-ROM drive 1060, which are connected to the cost controller 1082 through an input/output controller 1084; and a legacy input/output unit having a BIOS 1010, a flexible disk drive 1050, and an input/output chip 1070, all of which is connected to the input/output controller 1084.

The host controller 1082 mutually connects the main memory 1020 to the processor 10 and the graphics controller 1075 which access the main memory 1020 at a high transfer rate. The processor 10 is operated based on programs stored in the BIOS 1010 and the main memory 1020 to control the respective components. The graphics controller 1075 obtains image data, which is generated by the processor 10 or the like on a frame buffer provided in the main memory 1020, and displays the obtained image data on a display device 1080. In place of this, the graphics controller 1075 may internally include the frame buffer in which the image data generated by the processor 10 is stored.

The input/output controller 1084 connects the host controller 1082 to the communication interface 1030, the hard disk drive 1040 and the CD-ROM drive 1060, all of which is a relatively high-speed input/output device. The communication interface 1030 communicates with an external device via a network. In the hard disk drive 1040, programs and data to be used by the information processing system 30 are stored. The CD-ROM drive 1060 reads a program or data from a CD-ROM 1095 and provides the read program or data to the main memory 1020 or the hard disk 1040.

Moreover, the input/output controller 1084 is connected to relatively low-speed input/output devices such as the BIOS 1010, the flexible disk drive 1050, and an input/output chip 1070. In the BIOS 1010, there are stored programs such as a boot program executed by the processor 10 at a starting time of the information processing system 30 and a program depending on hardware of the information processing system 30. The flexible disk drive 1050 reads a program or data from a flexible disk 1090 and provides the read program or data to the main memory 1020 or hard disk drive 1040 through the input/output chip 1070. The input/output chip 1070 connects various kinds of input/output devices through, for example, the flexible disk drive 1050, a parallel port, a serial port, a keyboard port, a mouse port, and the like.

The result program to be provided to the information processing system 30 is provided from the communication interface 1030 through a telecommunication line. The result program causes the information processing system 30 to carry out an operation and other processings which program creators intend, and output the processing result. The above-explained program may be provided after being stored in an external storage medium. The storage medium may include an optical recording medium such as DVD and PD, a magneto-optic recording medium such as MD, a tape medium, and a semiconductor memory such as an IC card, in addition to the flexible disk 1090 and the CD-ROM 1095.

FIG. 4 shows an example of the target program 15. The target program 15 causes the information processing system 30 to implement Gaussian elimination method. In a following part, a compile processing of the information processing system 30 will be described by using the target program 15 as an example. Also, the target program 15 shown as the example is a pseudo-code for explaining the processing contents of the program along the processing procedure, and may be different from a program which is actually compiled. Moreover, the target program 15 is executed by two processor cores and one support processor. Then, a variable number N in the target program 15 represents a matrix size and N in this embodiment is assumed to be 4. Namely, the target program 15 aims to implement the Gaussian elimination method for the square matrix of 4×4.

Third to fifth lines of the program denote processing carried out by a support task. That is, an identification number of a task in execution is prestored in a variable my_task_id. When the identification number of the task is 0, the task means a support task. The support task distributes parameters of simultaneous equations to the other respective tasks and collects the processing results from the respective tasks based on programs on fourth and fifth lines.

Code on lines 6 to 26 denote processing carried out by the respective tasks except the support task. Each task acquires the parameters of simultaneous equations from the support task based on programs on seventh to eighth lines. Each task obtains a solution of a line having the same number as the identification number of the task based on programs on 9th to 18th lines. Each task acquires a solution from each of the tasks other than the task itself, based on programs on 19th to 25th lines. Moreover, the each task obtains a solution of the line handled by the task and transmits to the other task.

Figure 5:
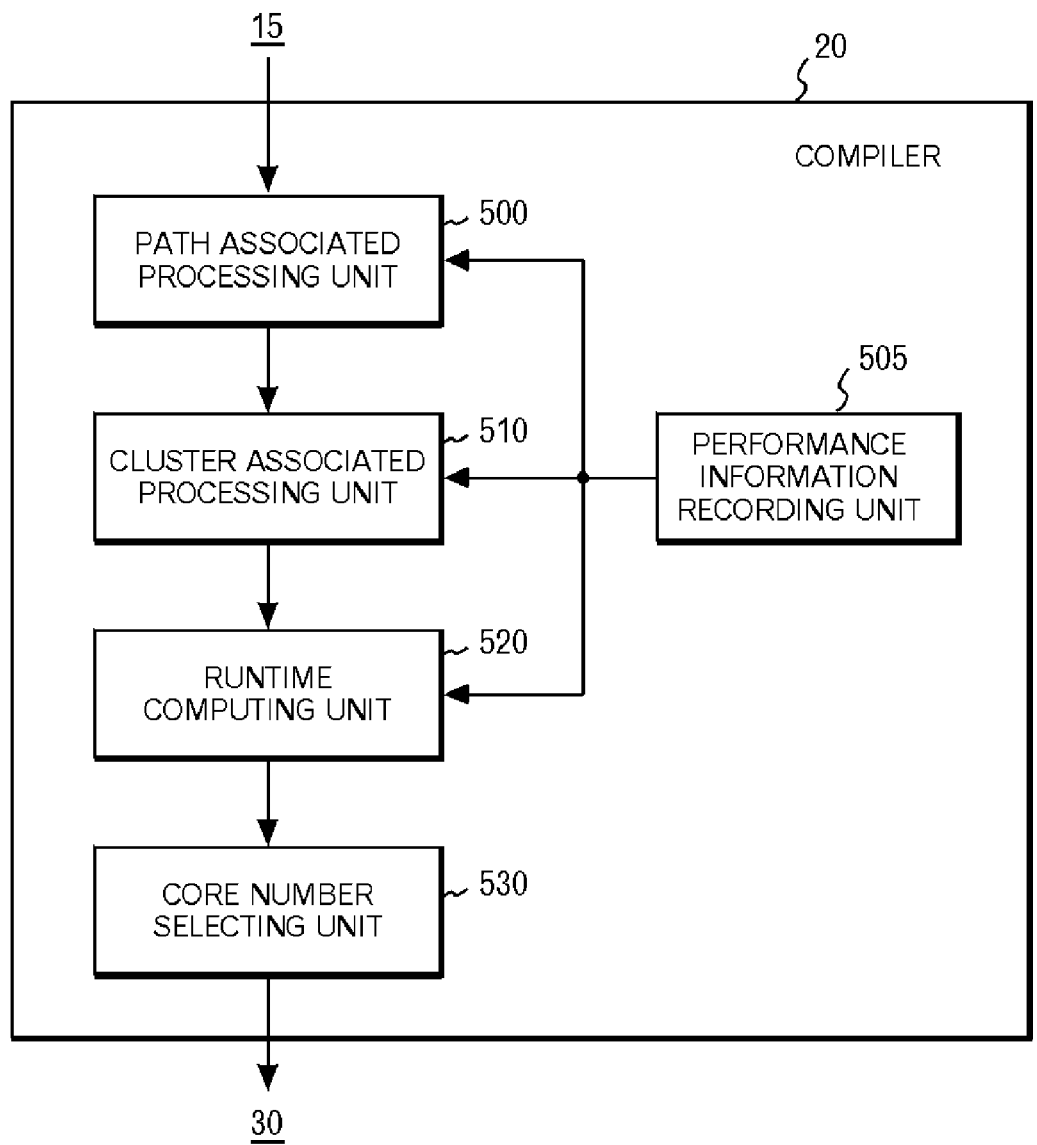
FIG. 5 shows a functional configuration of the compiler 20.

FIG. 5 shows a functional configuration of the compiler 20. The compiler 20 includes a path associated processing unit 500, a performance information recoding unit 505, a cluster associated processing unit 510, an execution time computing unit 520, and a core number selecting unit 530. The performance information recording unit 505 records various kinds of information relating to the performance of the information processing system 30. For example, the performance information recording unit 505 records the number of execution cores, which are the number of processor cores executing the target program 15 among processor cores provided in the processor 10. Moreover, the performance information recording unit 505 records an estimated required time for transferring task processing results to the other task through a local memory 110-1. It is noted that the required time may be not only an actual time such as microsecond, millisecond, and the like, but also an index value such as the number of execution cycles of the processor.

The path associated processing unit 500 detects a predetermined execution path from the target program 15 based on information on the performance obtained from the performance information recording unit 505. Here, the execution path refers to a flow of processing of multiple tasks having a relationship where a following task cannot be started before a precedent task is completed. More specifically, the path associated processing unit 500 may generate a directed graph where the respective tasks are used as nodes and dependencies (for example, control dependency or data dependency) among these nodes are used for edges, and may detect an execution path among from arbitrary paths in the graph by a predetermined method.

It is noted that each of the tasks in this embodiment is a part of processing in the target program 15. Preferably, each of the tasks is a group of commands, which is assured that preemption (for example, context switch) is not allowed during execution. In other words, for instance, prior to optimization processing, the compiler 20 divides the target program 15 by using a blocking communication function calling as a boundary, thereby generating multiple tasks.

The cluster associated processing unit 510 selects at least one task as a cluster from the multiple tasks included in the target program 15 by a predetermined method. The cluster associated processing unit 510 sequentially repeats this processing and classifies the multiple tasks included in the target program 15 into multiple clusters. Information recorded in the performance information recording unit 505 is also used for classifying the clusters.

The execution time computing unit 520 computes execution times for which each of the generated clusters is executed by the processor cores with the number equal to one or each of a plurality of natural numbers selected from the natural numbers not larger than the number of execution core. For example, when the number of execution cores is 7, the execution time computing unit 520 may compute execution times for which the cluster is executed by the processor cores with the number (that is, for instance, 3 and 5) equal to the natural numbers selected from the natural numbers not larger than 7. Preferably, the execution time computing unit 520 may select the number of processor cores by which the cluster can be executed most efficiently and compute the execution time for executing the cluster by the selected number of processor cores. For example, when it is known beforehand that the execution time for executing the cluster by three or more processor cores cannot be reduced in comparison with that by less than three processor cores, the execution time computing unit 520 may compute only the execution time for executing the cluster by three processor cores. Regarding the execution time, for example, the estimated value is computed based on the information recorded in the performance information recording unit 505.

The core number selecting unit 530 selects the number of processor cores, which are to be assigned for executing each of the clusters, for each of the generated clusters, based on the computed execution time in order to reduce the total execution time of the target program 15. The number of selected cores for each of the cluster may be informed to, for example, an instruction scheduler and other optimization modules. The result program generated based on the number of cores is outputted to the information processing system 30 and executed in the information processing system 30.

FIG. 6 shows an example of data structure of the performance information recording unit 505. As shown in FIG. 6A, the performance information recording unit 505 records a data transfer time and a context transfer time to be associated with a set of data transfer condition and context transfer condition. The data transfer condition is a condition that decides a method for transferring the processing result data from the precedent task to the following task which depends on the processing result. For example, the data transfer condition refers to any of the cases where the precedent task and the following task are consecutively executed by the same processor, where these tasks are executed by the different processors, and where these tasks are nonconsecutively executed.

On condition that the precedent task and the following task are consecutively executed by the same processor, the processing result of the precedent task is transferred to the following task via a local memory. Accordingly, the performance information recording unit 505 records a required time for transferring the processing result of the precedent task to the following task via the local memory as a data transfer time corresponding to this condition. This required time may be an estimated value of a required time to be expected from the performance of the processor 10 in stead of the actual required time.

On condition that the precedent task and the following task are executed by different processors or nonconsecutively executed, the processing result of the precedent task is transferred to the following task via a main memory. Accordingly, the performance information recording unit 505 records a required time for transferring the processing result of the precedent task to the following task via the main memory as a data transfer time corresponding to this condition. Similarly, this required time may be an estimated value of a required time to be expected from the performance of the information processing system 30.

Moreover, the context transfer condition is a condition that decides a method for switching contexts between the precedent task and the following task. For example, the context transfer condition refers to any of the cases where the precedent task and the following task are the same task, where the tasks are different from each other but their execution codes are the same, and where both tasks and execution codes are different from each other.

On condition that the precedent task and the following task are the same task, the execution code and the context recorded in the local memory are used in the following task as they are. Accordingly, the performance information recording unit 505 records 0 as a context transfer time corresponding to this condition. On the other hand, on condition that the precedent task and the following task are different from each other but their execution codes are the same, the execution code is used in the following task as it is. Accordingly, the performance information recording unit 505 records, as a context transfer time corresponding to this condition, a required time for saving the context of the precedent task from the local memory to the main memory and for returning the context of the following task from the main memory to the local memory. The context here indicates, for example, a value of a stack pointer and values of other registers.

Moreover, on condition that the execution codes of the preceding and following tasks are also different from each other, the execution code of the following task is read into the local memory from the main memory in place of the execution code of the precedent task. Accordingly, the performance information recording unit 505 records a time, as context transfer time corresponding to this condition, by adding a required time for reading the execution code of the following code, in place of the execution code of the precedent task, from the main memory to the local memory, to the above described required time for saving and returning the contexts.

Additionally, the performance information recording unit 505 further records the number of execution cores as shown in FIG. 6B. Since the number of execution cores is the number of processor cores executing the target program 15, the number of the execution cores is not always consistent with the number of cores provided in the processor 10. For example, the number of execution cores may be a number obtained by excluding one corresponding to the support processor from the number of cores provided in the processor 10. When the processor 10 has eight processor cores as an example, the number of execution cores is 7. The number of execution cores may be predetermined or decided by a user of the compiler 20.

Figure 7:
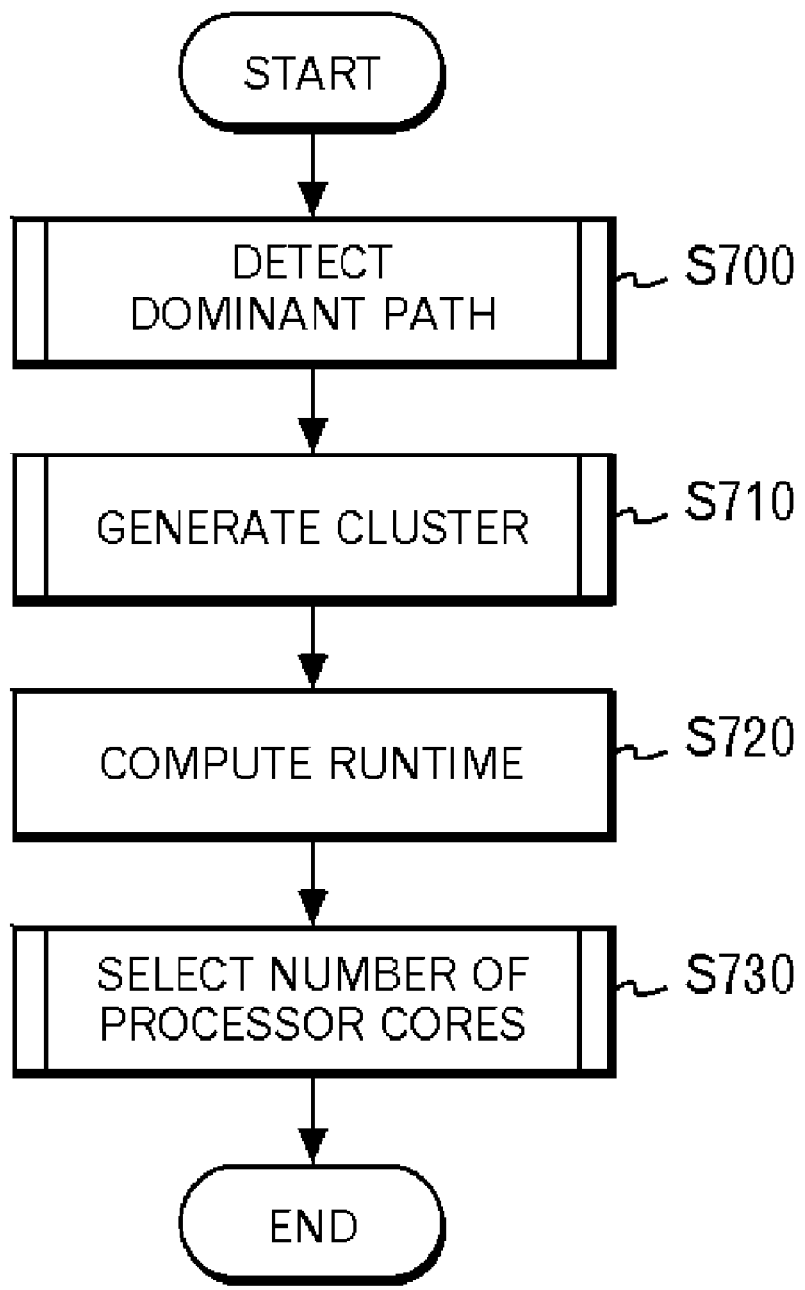
FIG. 7 shows the general flow of processing in which the compiler 20 compiles the target program 15.

FIG. 7 shows a general flow of processing in which the compiler 20 compiles the target program 15. The path associated processing unit 500 detects a dominant path, which is a candidate of an execution path of one or more tasks to be consecutively executed by a single processor core based on information on the performance obtained from the performance information recording unit 505 (S700). Preferably, the performance information recording unit 505 detects execution paths as dominant paths which have a large gain in improvement of performance as compared with the case in which the tasks are executed by different processor cores or the tasks are nonconsecutively executed.

The cluster associated processing unit 510 selects dominant paths with not more than the number of the execution cores, and generates clusters of tasks to be executed by the processor 10 in parallel or in succession (S710). Since the number of dominant paths in the generated clusters is not larger than the number of the execution cores, the gain in improvement of performance is not lost by selecting the dominant paths even if the tasks are executed in parallel.

The execution time computing unit 520 computes execution times for which each of the generated clusters is executed the processor cores with the number equal to one or each of the plurality of natural numbers selected from not larger than the number of execution cores. For example, when the number of execution cores is 7, the execution time computing unit 520 may compute execution times for which the cluster is executed by the processor cores with at least two of the numbers not larger than 7, that is, for instance, 3 and 5. Regarding the execution time, for example, the estimated value is computed based on information recorded in the performance information recording unit 505.

In addition to the above, the execution time computing unit 520 may compute an execution time in each case of the processor cores with the number between or equal to three and the number of the execution cores. Preferably, the execution time computing unit 520 computes execution times for which each of the generated clusters is executed by the processor cores with the number equal to the natural number between or equal to one and the number of the execution cores. Namely, for example, when the number of execution cores is 7, the execution time computing unit 520 desirably computes execution times for executing each of the clusters by one, two, three, four, five, six, and seven processor cores, respectively.

More preferably, in order to compute the execution times, the execution time computing unit 520 estimates the execution times of each cluster in a way that a preestimated maximum required time is needed for task switching from inside of a cluster to outside of the cluster or task switching from outside of the cluster to inside of the cluster. The preestimated maximum required time is, for example, a time required for memory access which is caused when these clusters are non-consecutively executed.

In actual, when a certain cluster is executed first and consecutively another cluster is executed, task switching time from the cluster to the other cluster is shorter than the maximum required time. However, in the processing stage of computing the execution times, it is impossible to determine whether the cluster and the other cluster are consecutively executed. Accordingly, the execution time computing unit 520 of this embodiment regards the required time for task switching as a uniform maximum required time. This allows the execution times of each cluster to be evaluated on a uniform condition.

Then, the core number selecting unit 530 selects the number of processor cores to be assigned for the execution of each of the clusters based on the computed execution times in order to reduce the total execution time of the target program 15 (S730).

Figure 8:
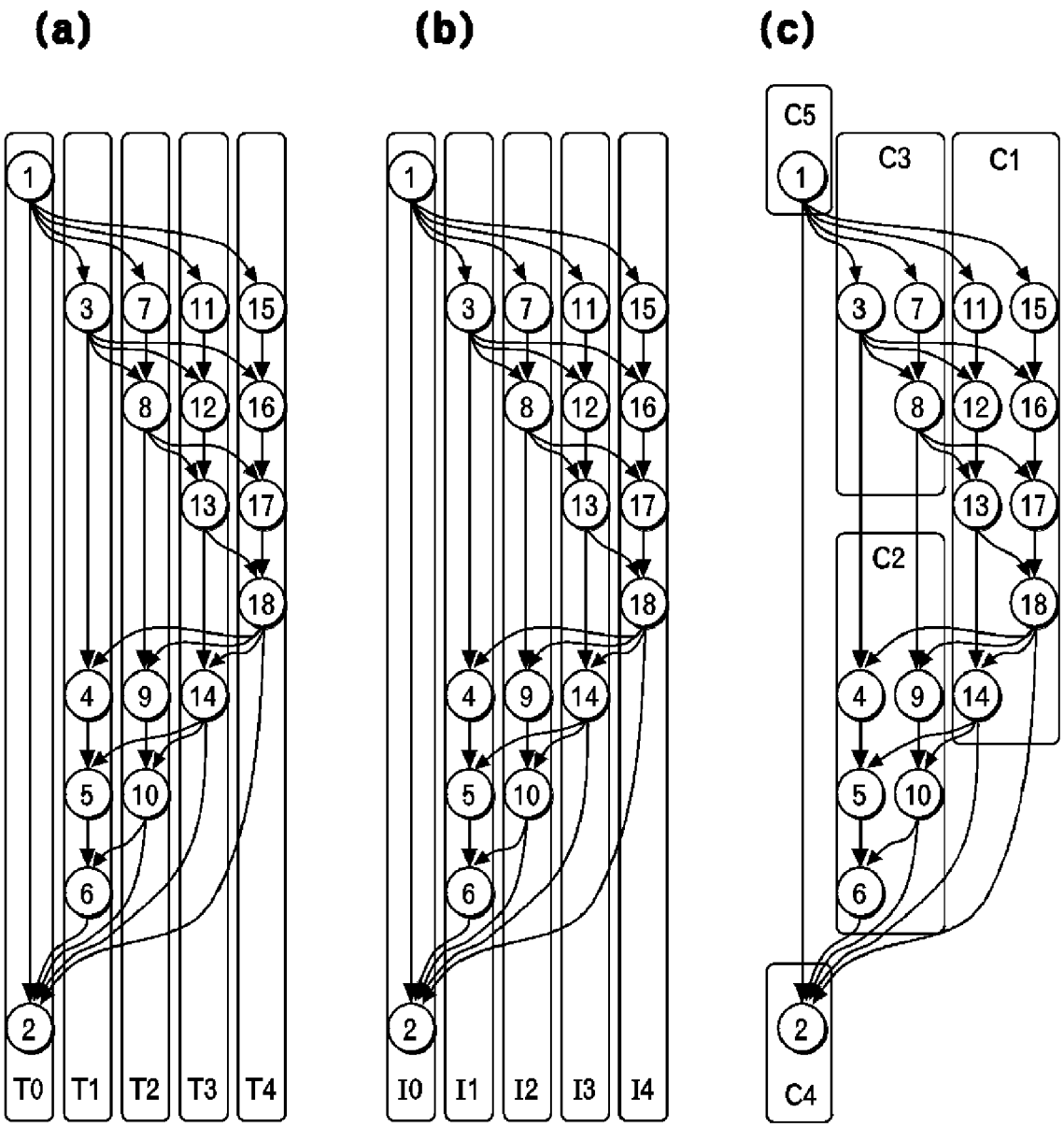
FIG. 8 shows a process where multiple tasks included in the target program 15 are scheduled (first figure of the two figures).

FIG. 8 shows a process where the multiple tasks included in the target program 15 are scheduled (first figure of two figures). FIG. 8A shows dependency relations among tasks explicitly defined in the target program 15. In the figure, circular regions indicate respective tasks and arrows in the figure indicate the dependency relations among tasks. In the figure, each of rectangular regions shows a task group explicitly defined as a series of processing on the text of the target program 15. For example, a command group (T0) corresponds to processing in third to fifth lines in FIG. 4 and each of command groups (T1 to T4) corresponds to each of repetition processings of "for" sentences shown in 10th to 18th lines in FIG. 4.

Each of the repetition processings is divided into multiple tasks since blocking communication commands are included in the course of the processing. The multiple tasks interdepend on one another according to the processing contents. For example, each of 2nd, 3rd, 7th, 11th and 15th tasks depends on the processing result of the first task.

FIG. 8B shows an example of dominant paths detected by the path associated processing unit 500. The rectangular regions (10 to 14) in this figure show dominant paths detected by the path associated processing unit 500. Namely, 15th, 16th, 17th, and 18th tasks form a task group to be consecutively executed by the same processor. More specifically, this shows that the consecutive execution of 16th task after 15th task leads to a large gain in the improvement of performance as compared with the consecutive execution of 12th task after 15th task. In the example in this figure, each of the command groups T0 to T4 explicitly defined in the target program 15 is consistent with each of the dominant paths 10 to 14, but they are not always consistent with one another.

FIG. 8C shows an example of clusters generated by the cluster associated processing unit 510. Each of rectangular regions shown by C1 to C5 shows each of the clusters generated by the cluster associated processing unit 510. In other words, the cluster associated processing unit 510 selects dominant paths whose upper limit number is 2, which corresponds to the number of execution cores, thereby generating clusters. As an example, a cluster C1 is generated by dominant paths 13 and 14 shown in FIG. 8B.

Figure 9:
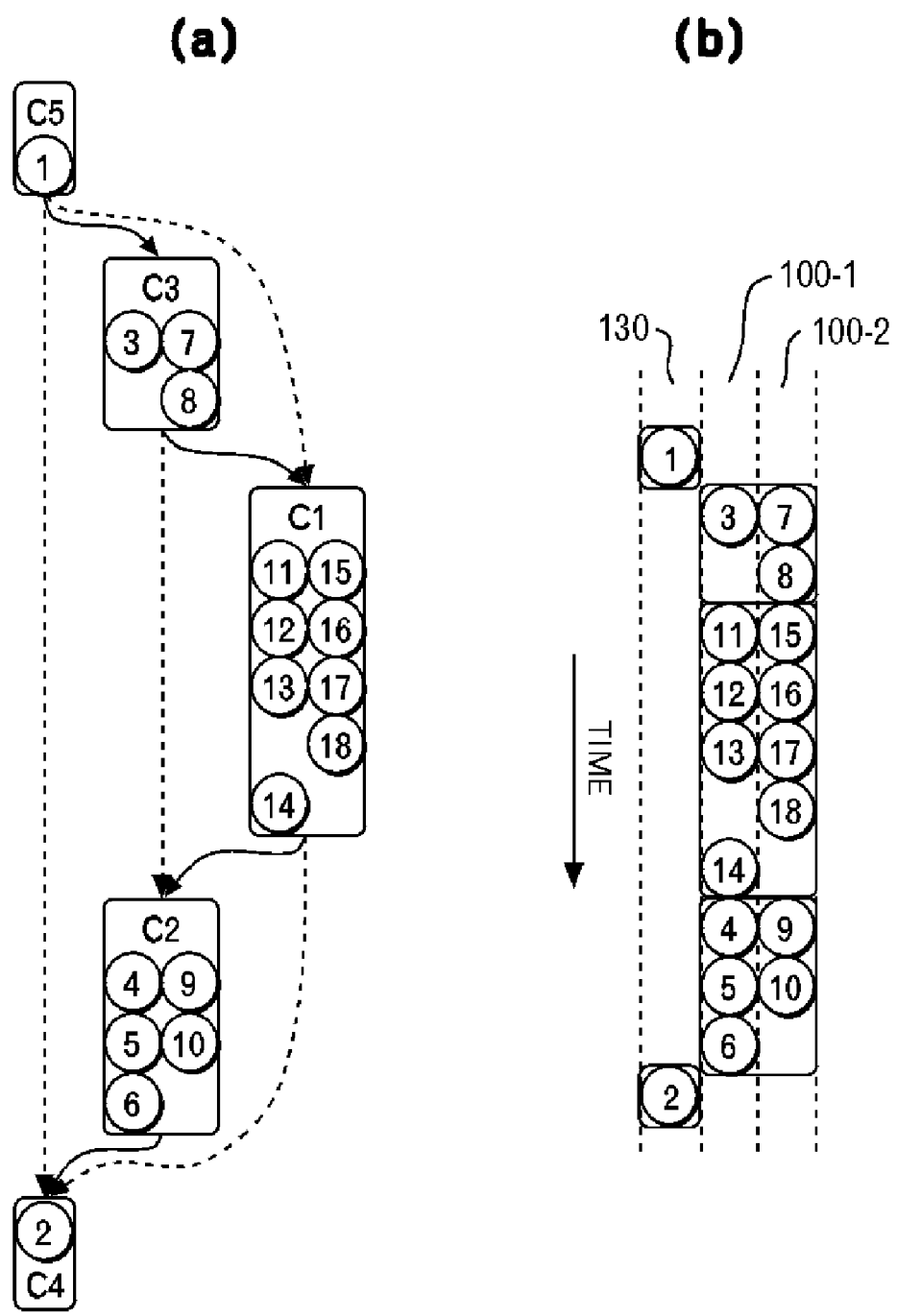
FIG. 9 shows a process where the multiple tasks included in the target program 15 are scheduled (second figure of two figures).

FIG. 9 shows a process where the multiple tasks included in the target program 15 are scheduled (second figure of the two figures). The cluster associated processing unit 510 generates a series-parallel graph which defines the dependency relations in execution among the respective clusters in order to select the number of processor cores to be assigned to each of the clusters. FIG. 9A shows an example of a series-parallel graph generated by the cluster associated processing unit 510.

First of all, as for specific processing, the cluster associated processing unit 510 eliminates transitive dependency relations from the graph which defines the dependency relations among the clusters. For example, in FIG. 8C, the cluster C1 directly depends on the cluster C5 and the cluster C1 also directly depends on the cluster C3, and the cluster C3 directly depends on the cluster C5. In this case, the dependency relation where the cluster C1 directly depends on the cluster C5 is the transitive dependency relation. The cluster associated processing unit 510 eliminates this kind of transitive dependency relations.

As a result, the cluster associated processing unit 510 generates a graph, as a series-parallel graph, where the clusters C4, C2, C1, and C3 directly depend on the clusters C2, C1, C3, and C5, respectively. These cluster groups denotes sequential execution parts where clusters are sequentially executed in this order, each of which is called as a series suite. The core number selecting unit 530 selects the number of processor cores to be assigned for the execution of each of the clusters by a dynamic programming in order to reduce the total execution time of this series suite. In this example, two processor cores are simply assigned to each cluster.

FIG. 9B shows the sequence in which the respective tasks are executed based on the compiled result program. More specifically, the task 1 is first executed by the support processor 130 and the task 2 is executed last. Also, the tasks of the cluster C3 are executed in parallel by the processor cores 100-1 and 100-2, those of the cluster C1 are executed in parallel, and those of the cluster C2 are executed in parallel.

Next, the detailed description will be provided about each of (1) detection of dominant paths, (2) generation of clusters, and (3) selection of the number of processor cores.

Figure 10:
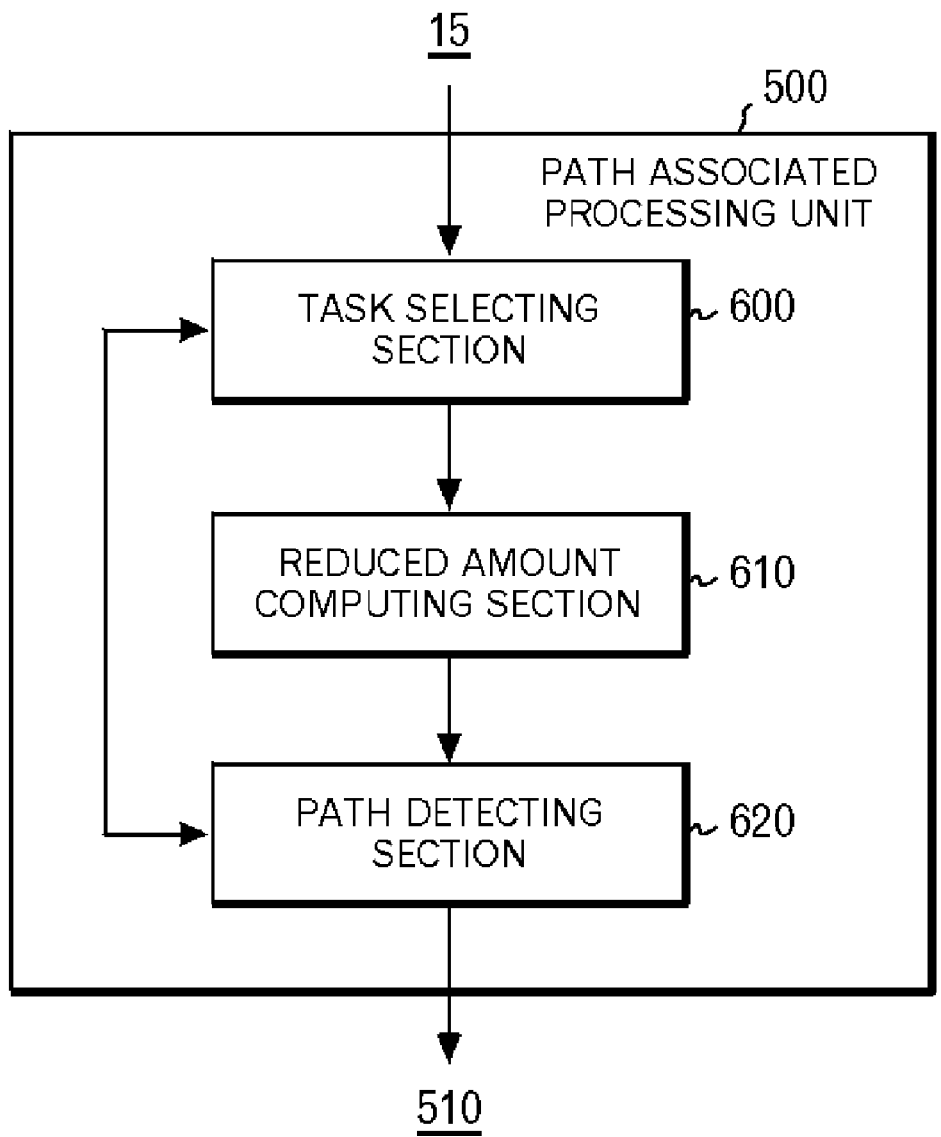
FIG. 10 shows a functional configuration of the path associated processing unit 500.

(1) On the Detection of Dominant Paths:

FIG. 10 shows a functional configuration of the path associated processing unit 500. The path associated processing unit 500 includes a task selecting section 600, a reduced amount computing section 610, and a path detecting section 620. With respect to the first task in the target program 15, the task selecting section 600 selects at least one second task which depends on the processing result of the first task (for example, it selects all tasks depending on the processing result). The reduced amount computing section 610 computes a reduced amount of a task switching time to be reduced when the second task after the first task is executed by the same processor cores in comparison with a task switching time when the first task and the selected second task are executed by different processor cores.

This reduced amount includes times required for saving and returning the contexts when the contexts of the first and second tasks are the same. Moreover, even if the contexts of the first and second tasks are different, when the execution codes are the same, the reduced amount includes a time for reading the execution code from the main memory 1020 into the local memory. In other words, the reduced amount computing section 610 computes a time, as the reduced amount when the first and second tasks execute the same execution code, by adding a required time for reading the execution code from the main memory 1020 into the local memory to a reduced amount when the first and second tasks execute different execution codes.

The path detecting section 620 detects the second task having a maximum range of the computed reduced amount, included in the dominant path. Then, the second task included in the dominant path is used as a new first task, and the task selecting section 600 repeats the same processing as the above with respect to a new second task depending on the first task. On condition that all tasks included in any of the dominant paths are detected, the path detecting section 620 outputs the detection result to the cluster associated processing unit 510.

Figure 11:
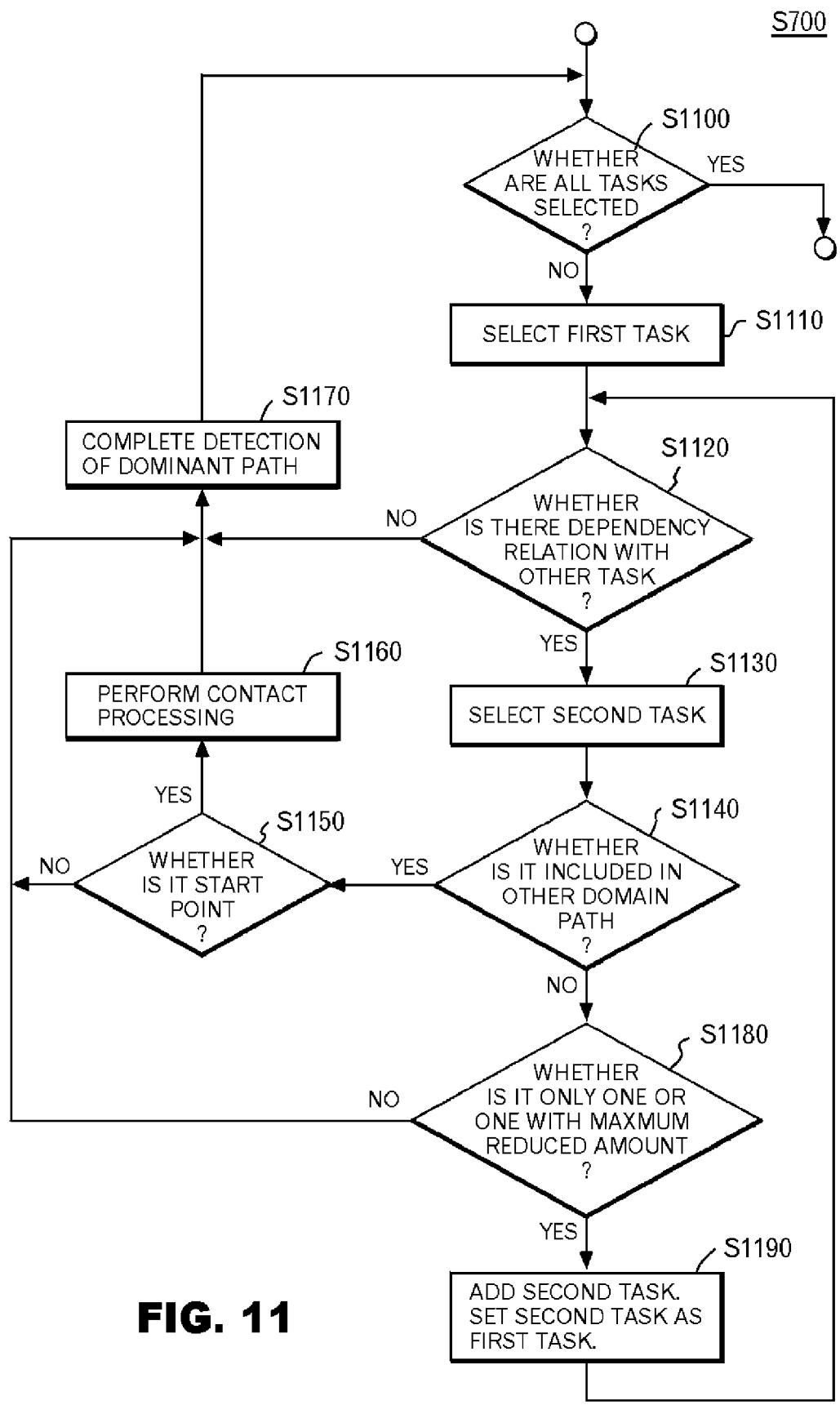
FIG. 11 shows the details of processing in S700.

FIG. 11 shows the details of processing in S700. The task selecting section 600 determines whether all tasks are already selected so as to be included in any of the dominant paths (S1100). On condition that all tasks are already selected (S1100: YES), the path associated processing unit 500 ends the processing in this figure. When the selection is not completed (S1100: NO), the task selecting section 600 selects any of tasks, which are not yet selected, as a first task (S1110).

Next, the task selecting section 600 determines whether the first task has the direct dependency relation with the other tasks except the support task (S1120). On condition that the first task has no direct dependency relation (S1120: NO), the path associated processing unit 500 completes the detection of a dominant path including the first task (S1170) and moves processing to S1100 to detect a next dominant path.

On condition that the first task has the direct dependency relation (S1120: YES), the task selecting section 600 selects at least one second task, which depends on the processing result of the first task (S1130). When the selected second task is already included in another dominant path (S1140: YES), the task selecting section 600 determines whether the second task is a starting point for the dominant path (S1150). When the second task is a starting point (S1150: YES), the path detecting section 620 connects the dominant path to the dominant path, which is being detected, using the second task as a contact point, to generate a new dominant path (S1160), and returns processing to S1100 to detect another dominant path (S1170).

When the second task is not a starting point (S1150: NO), the task selecting section 600 completes the detection of the dominant path without including the second task (S1170) and returns processing to S1100. Accordingly, this makes it possible to exclude the branch from the dominant path and the confluence thereinto. On condition that the second task is not included in the other dominant path (S1140: NO), the path detecting section 620 determines whether the second task is the only task having a direct dependency relation with the first task or whether the computed reduced amount of the second task is the largest (S1180).

At this time, preferably, with respect to each of the precedent tasks where the second task depends on the processing result, the reduced amount computing section 610 further computes a reduced amount, which is to be reduced by executing the second task after the precedent task by the same processor core in comparison with the task switching time when the first precedent task and the second task are executed by the different processor cores. Then, on further condition that the reduced amount of the first task is the largest among the multiple precedent tasks, the path detecting section 620 detects the second task so as to be included in the dominant path together with the first task (S1190).

This determination processing will be explained using FIG. 12. FIG. 12 shows a specific example of processing for detecting dominant paths. In the figure, a function Save ( ) indicates a function for computing a reduced amount of a task switching time. More specifically, Save (T, S) indicates a range of a reduced amount of the task switching time to be reduced by executing task S consecutively after task T by the same processor core.

T indicates a first task, and each of S to Sj indicates another task depending on the processing result of the first task. Among these, Sd is assumed to be a second task. Moreover, each of P1 to Pl is a precedent task of Sd, and Sd depends on the processing result of each of P1 to Pl.

As shown in FIG. 12A, the path detecting section 620 detects the task Sd in a way to be included in the dominant path, when the range of the reduced amount Save (T, Sd) in a case where the task Sd is executed consecutively after the task T by the same processor core is larger than the range of the reduced amount in a case where any of other tasks is executed after the task T.

As shown in FIG. 12B, with respect to each of the precedent tasks (P1 to Pl) where the second task (Sd) depends on the processing result, the reduced amount computing section 610 further computes a reduced amount Save (P, Sd), which is reduced by executing the precedent task and the second task by the same processor core. Then, on further condition that the reduced amount of the first task (T) is the largest among the multiple precedent tasks (P1 to Pl), the path detecting section 620 detects the second task (Sd) in a way to be included in the dominant path together with the first task (T).

FIG. 12C shows a case in which the range of the reduced amount of the first task is not the largest. Among the precedent tasks (P1 to Pl) where the second task (Sd) depends on the processing result, the precedent task which range of the reduced amount of task switching time is the largest is Pd, and is different from T, which is the first task. In such a case, preferably, the path detecting section 620 does not include the second task (Sd) in the same dominant path as the first task (T) (S1180: NO). This is because the second task may be included in the same dominant path as the other tasks such as, for example, the precedent task (Pd).

The description goes back to FIG. 11. The path detecting section 620 detects the second task in a way to be included in the dominant path together with the first task (S1190). The task selecting section 600 selects this second task as a new first task (S1190) and returns processing to S1120.

Figure 13:
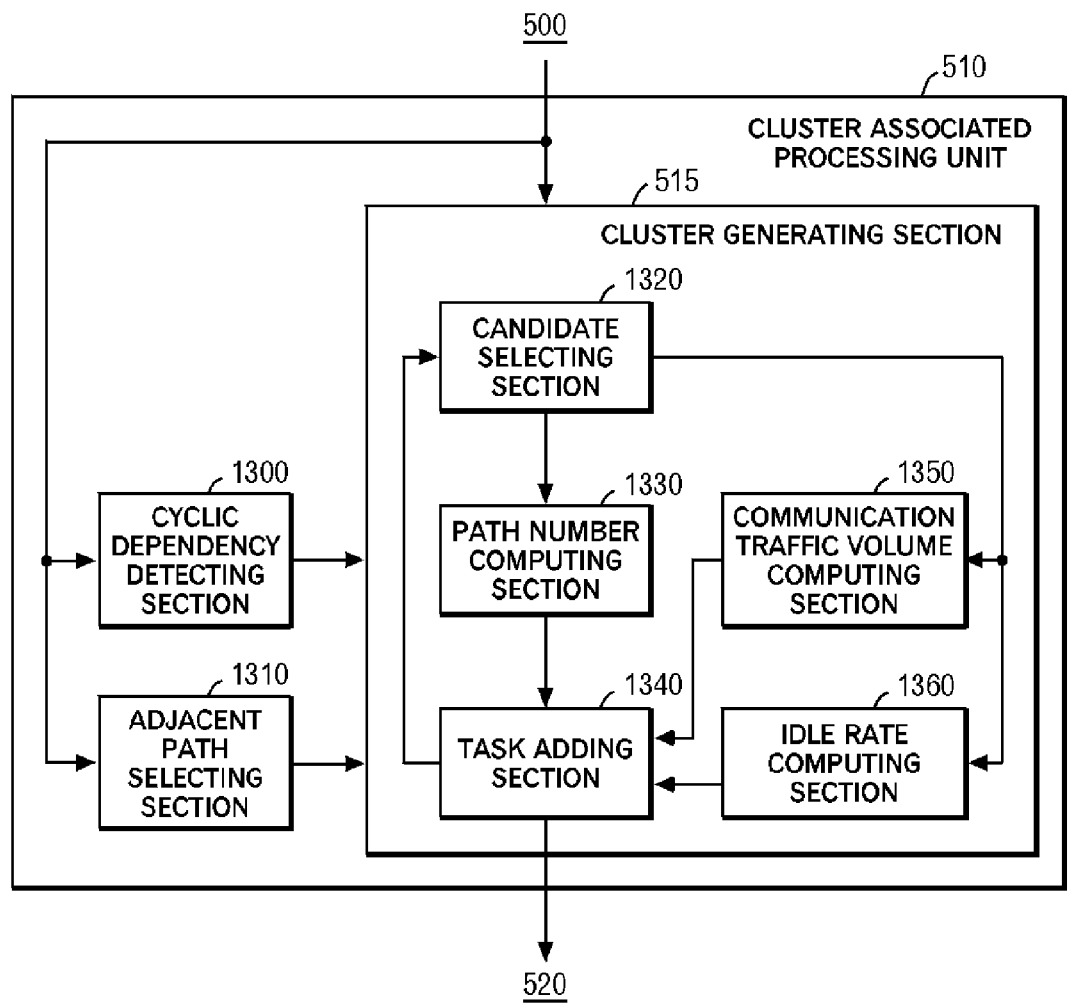
FIG. 13 shows a functional configuration of a cluster associated processing unit 510.

(2) Generation of Clusters:

FIG. 13 shows a functional configuration of the cluster associated processing unit 510. The cluster associated processing unit 510 includes a cluster generating section 515, a cyclic dependency detecting section 1300, and an adjacent path selecting section 1310. The cyclic dependency detecting section 1300 detects a cyclic dependency of each of the detected dominant paths. The cyclic dependency in a certain dominant path denotes that when a task in another execution path depends on processing of any of the tasks in the dominant path, another task in the dominant path further depends on processing of the task in the other execution path.

The adjacent path selecting section 1310 selects an adjacent path, which is the other dominant path including a task performing direct data transfers with any of the tasks, with respect to each of the detected dominant paths. The cluster generating section 515 selects the detected dominant path having less cyclic dependencies in priority to the other dominant paths, and generates a cluster including the selected dominant path and the other tasks. On condition that the number of detected cyclic dependencies is the same as that of each of the dominant paths, the cluster generating section 515 selects a dominant path having fewer adjacent paths in priority to the other dominant paths, and generates a cluster including the selected dominant path and the other tasks.

The cluster generating section 515 includes a candidate selecting section 1320, a path number computing section 1330, a task adding section 1340, a communication traffic volume computing section 1350, and an idle rate computing section 1360. With respect to the selected dominant path, the candidate selecting section 1320 selects a candidate task, which is a candidate of a task to be included in the cluster together with the dominant path. In the case where the candidate task is included in the cluster together with the dominant path, the path number computing section 1330 computes the total number of dominant paths included in the cluster. On condition that the total number of the dominant paths obtained by computing is not larger than the number of execution cores, the task adding section 1340 generates the cluster including the candidate task.

The communication traffic volume computing section 1350 computes a sum of communication traffic volumes in which the candidate task communicates with each of the multiple tasks in the cluster. In the case where the candidate task is included in the cluster together with the dominant path, the idle rate computing section 1360 computes a time rate at which the processor is in an idle state when the tasks in the cluster are executed by the processor cores with the equal number to the number of the execution cores. On further condition that the sum of communication traffic volumes is larger than a predetermined reference, the task adding section 1340 generates a cluster including the candidate task. More preferably, on further condition that the time rate at which the processor is in an idle state is equal to or smaller than a predetermined reference value, the task adding section 1340 generates a cluster including the candidate task.

Figure 14:
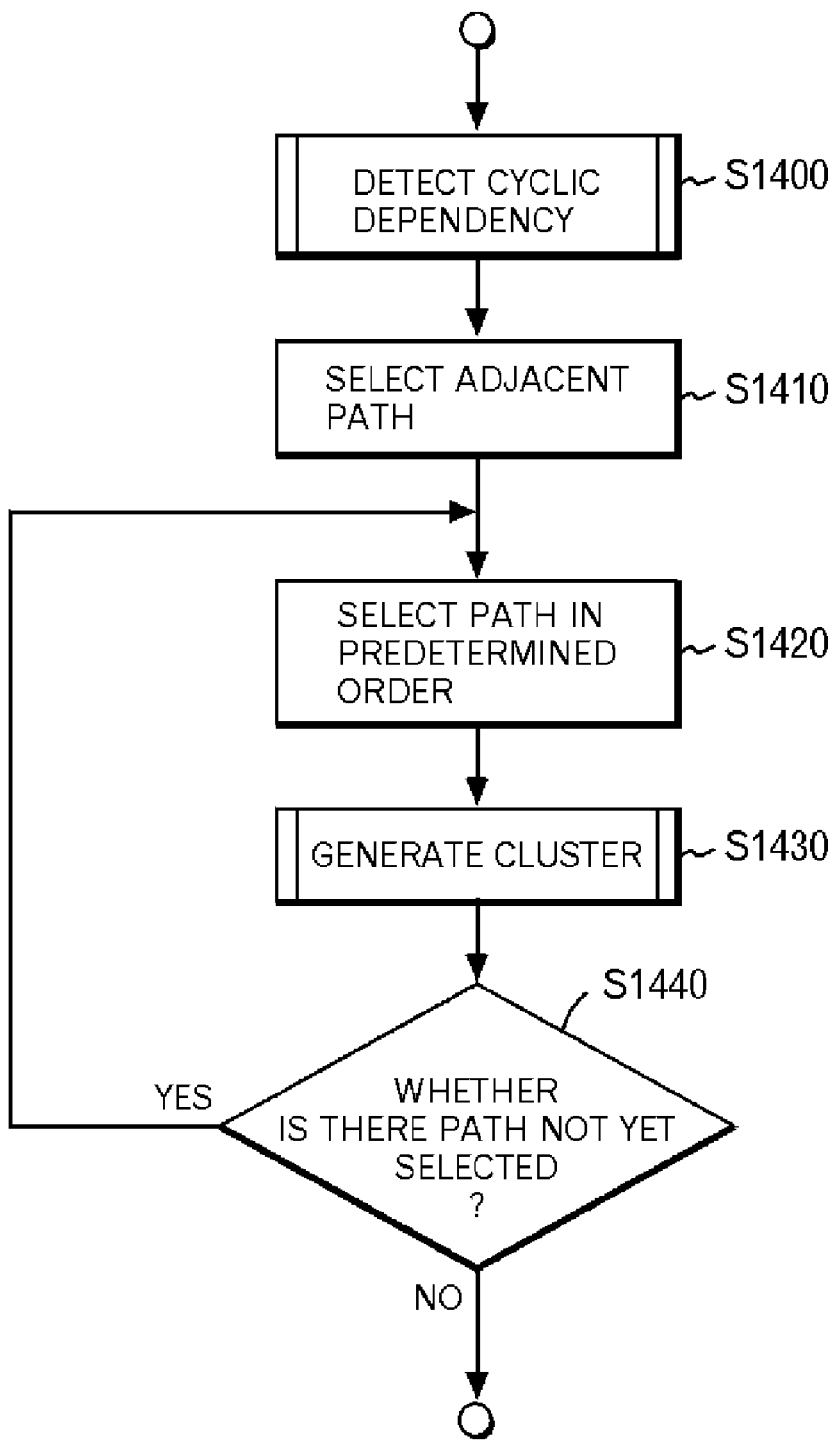
FIG. 14 shows the details of processing in S710.

FIG. 14 shows the details of processing in S710. The cyclic dependency detecting section 1300 detects the cyclic dependency of each of the dominant paths (S1400). Moreover, the cyclic dependency detecting section 1300 selects the adjacent path with respect to each of the dominant paths (S1410). The cluster generating section 515 sequentially selects dominant paths in ascending order of the number of cyclic dependencies or in ascending order of the number of adjacent paths when the numbers of cyclic dependencies are the same (S1420).

The cluster generating section 515 generates the cluster including the other task in the selected dominant path (S1430). When there is a dominant path, which is not yet selected (S1440: YES), the cluster generating section 515 returns processing to S1420. On the other hand, when all dominant paths are selected as clusters (S1440: NO), the cluster generating section 515 ends the processing in this figure.

Figure 15:
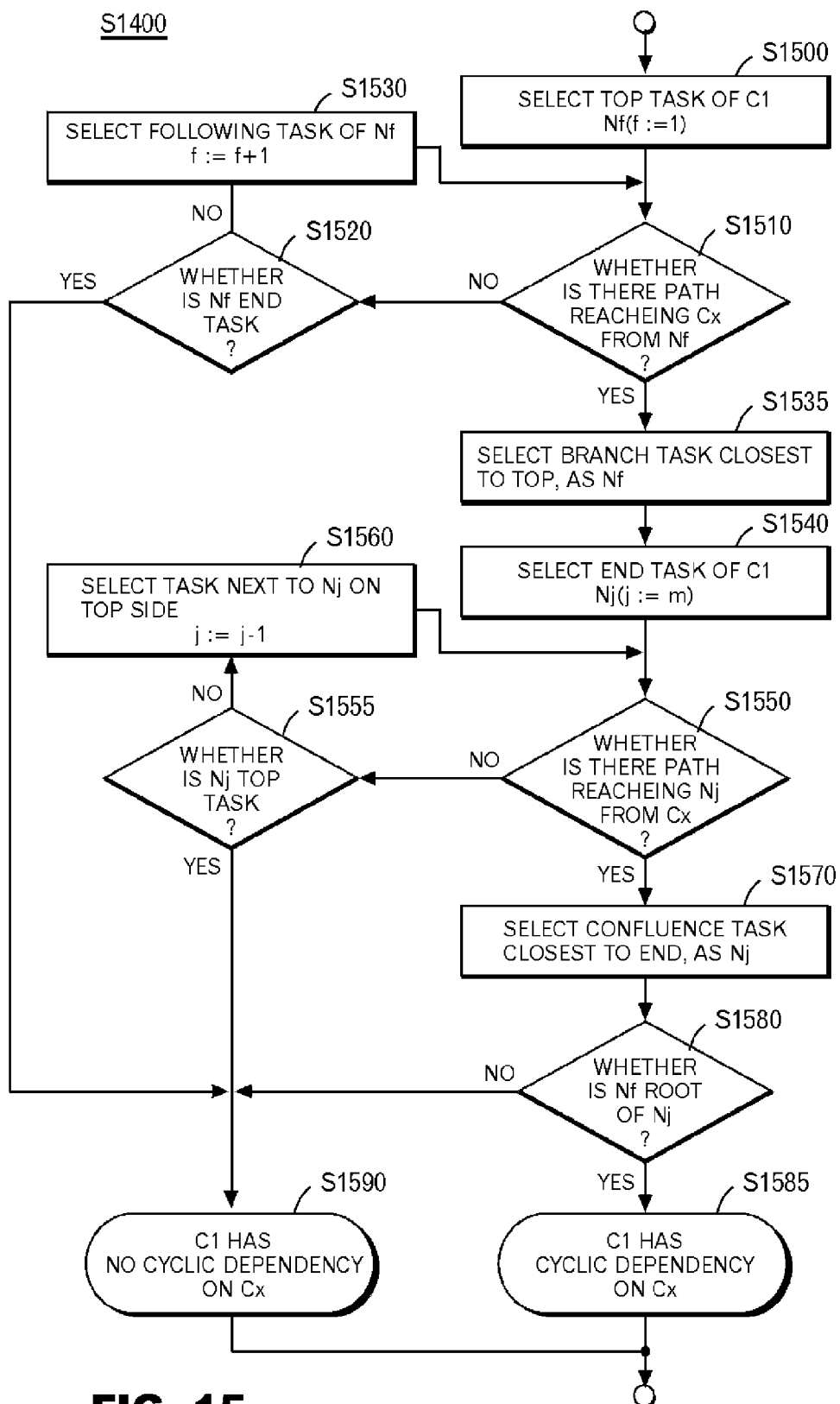
FIG. 15 shows the details of processing in S1400.

FIG. 15 shows the details of processing in S1400. In S1400, the cyclic dependency detecting section 1300 detects cyclic dependencies between the respective dominant paths and the other respective dominant path. In this figure, in the course of this processing, an explanation will be given of processing as to whether a certain dominant path has a cyclic dependency on the other dominant path. More specifically, when a target dominant path is assumed to be a dominant path C1, it is determined whether the dominant path C1 has a cyclic dependency on a dominant path Cx.

First of all, the cyclic dependency detecting section 1300 selects a top task of the dominant path C1 (S1500). The top task is assumed to be Nf. Here, f is a variable in which the number sequentially attached to each of the tasks from the top to the end is stored. Namely, the top task becomes N1.

Figure 16:
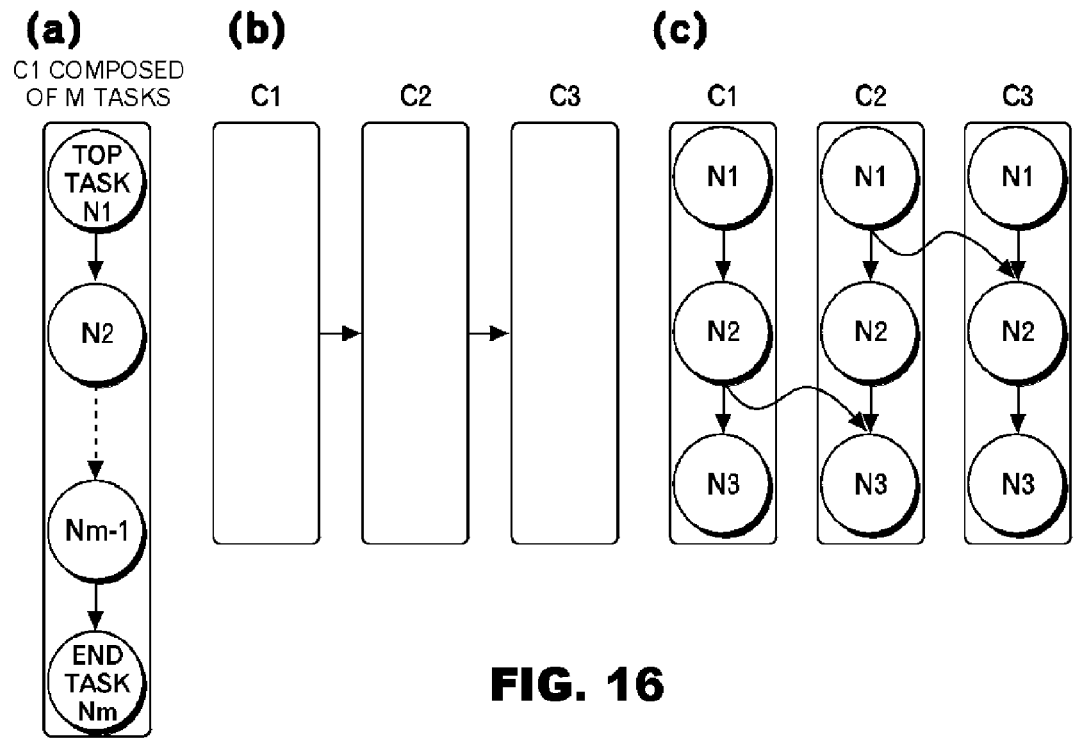
FIG. 16 shows a dependency graph of tasks to be subjected to detection of cyclic dependencies.

FIG. 16 shows a dependency graph of tasks to be subjected to detection of a cyclic dependency. As shown in FIG. 16A, in the dominant path C1 composed of m tasks, the numbers 1 through m are sequentially attached to the tasks from the top to the end.

The explanation goes back to FIG. 15. The cyclic dependency detecting section 1300 determines whether there is a dependency path that reaches the task in the dominant path Cx from the task Nf (S1510). When there is no dependency path (S1510: NO), the cyclic dependency detecting section 1300 determines whether the task Nf is the end task of the dominant path C1 (S1520). When it is determined as the end task (S1520: YES), the cyclic dependency detecting section 1300 determines that the dominant path C1 has no cyclic dependency on the dominant path Cx (S1590) and ends the processing.

In S1510, it is determined whether there is a dependency path that reaches the task in the dominant path Cx from the task Nf. For the above mentioned reaching determination a dependency graph among the dominant paths is used, in stead of a dependency graph among the tasks. FIG. 16B shows the dependency graph among the dominant paths and FIG. 16C shows the dependency graph among the tasks. In FIG. 16C, it is impossible to reach any of the tasks in the dominant path C3 from the tasks N2 in the dominant path C1 and C2. On the other hand, in FIG. 16B, it is possible to reach the dominant path C3 from any of the tasks in the dominant path C1. In S1510, the cyclic dependency detecting section 1300 determines the presence of the dependency path based on the dependency graph between the dominant paths.

The explanation goes back to FIG. 15. While, when the task Nf is not the end task of the dominant path C1 (S1520: NO), the cyclic dependency detecting section 1300 selects a following task of the task Nf. For example, the following task can be selected by adding 1 to the variable f, since it is the task which is next closest to the top. The following task is set as a new task Nf and processing is returned to S1510.

On condition that there is a dependency path that reaches the task in the dominant path Cx from the task Nf (S1510: YES), the cyclic dependency detecting section 1300 selects a branch task, which is closest to the top, as Nf (S1535). The branch task refers to a task from which there exist dependency paths to multiple tasks. In other words, the multiple tasks depend on the processing result of the branch task. Then, the cyclic dependency detecting section 1300 selects the end task in the dominant path C1, as task Nj (S1540).

Next, the cyclic dependency detecting section 1300 determines whether there is a path which reaches the task Nj from any of the tasks in the dominant path Cx (S1550). When there is no path (S1550: NO), the cyclic dependency detecting section 1300 determines whether the task Nj is the top task of the dominant path C1 (S1555). For example, if a variable j is 1, Nj is the top task.

When the task Nj is the top task (S1555: YES), the cyclic dependency detecting section 1300 determines that the dominant path C1 has no cyclic dependency on the dominant path Cx (S1590) and ends the processing. On the other hand, when the task Nj is not the top task (S1555: NO), the cyclic dependency detecting section 1300 selects a task which is next to the task Nj on the top side, sets the selected task as a new task Nj (S1560), and moves processing to S1550.

On condition that there is a path that reaches the task Nj from any of tasks in the dominant path Cx (S1550: YES), the cyclic dependency detecting section 1300 selects a confluence task, which is closest to the end, as the task Nj (S1570). The confluence task refers to a task to which there exist dependency paths from the multiple tasks. In other words, the confluence task depends on the processing results of the multiple tasks.

On condition that the task Nf is a root of the task Nj (S1580: YES), the cyclic dependency detecting section 1300 determines that the dominant path C1 has a cyclic dependency on the dominant path Cx (S1585). Here, the point that the task Nf is the root of the task Nj means that the task Nj directly or indirectly depends on the processing result of the task Nf. On condition that the task Nf is not the root of the task Nj (S1580: NO), the cyclic dependency detecting section 1300 determines that the dominant path C1 has no cyclic dependency on the dominant path Cx (S1590).

Figure 17:
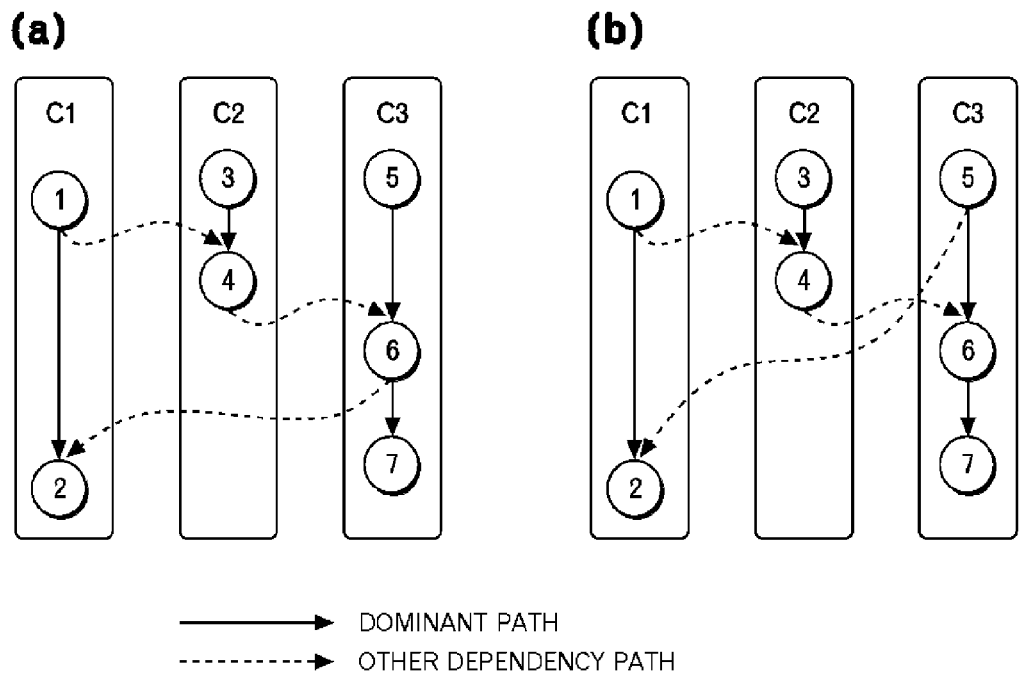
FIG. 17 shows specific examples of task groups where the cyclic dependencies occur.

FIG. 17 shows a specific example of a task group where the cyclic dependency occurs. As shown in A, task 1 in the dominant path C1 has a dependency path on task 6 in the dominant path C3. On the other hand, task 6 has a dependency path on task 2 in the dominant path C1. In this case, execution of the dominant path C3 depends on that of the dominant path C1 and the execution of the dominant path C1 depends on that of the dominant path C3. In this case, the cyclic dependency detecting section 1300 determines that the dominant path C1 has the cyclic dependency on the dominant path C3. For the same reason as the above, the cyclic dependency detecting section 1300 determines that the dominant path C1 has the cyclic dependency on the dominant path C2.

On the other hand, as shown in B, task 1 in the dominant path C1 has a dependency path on task 6 in the dominant path C3. However, task 6 has no dependency path on any of the tasks in the dominant path C1. In such a case, the cyclic dependency detecting section 1300 determines that the dominant path C1 has no cyclic dependency on the dominant path C3.

As mentioned above, according to the processing in this figure, it is possible to determine whether a certain dominant path has a cyclic dependency on the other dominant path. Here, the characteristic of the dominant path having the cyclic dependency will be discussed as follows. The certain dominant path and the other dominant path, which depend on each other, should be executed in parallel by the same processor. Otherwise, two or more times of context switching occur between the certain dominant path and the other dominant path, and this reduces execution efficiency of the entire program.

As described above, the cluster associated processing unit 510 in this embodiment reduces the degree of priority in the cluster generation in connection with the set of dominant paths to be clearly executed in parallel, and causes the other dominant paths to be executed in parallel, thereby improving the efficiency of the entire program. Accordingly, as explained in S1420, the cluster associated processing unit 510 sequentially generates dominant paths as clusters in ascending order of the number of cyclic dependencies. This makes it possible to draw parallelism in the processing of the target program 15 and to improve the efficiency.

Figure 18:
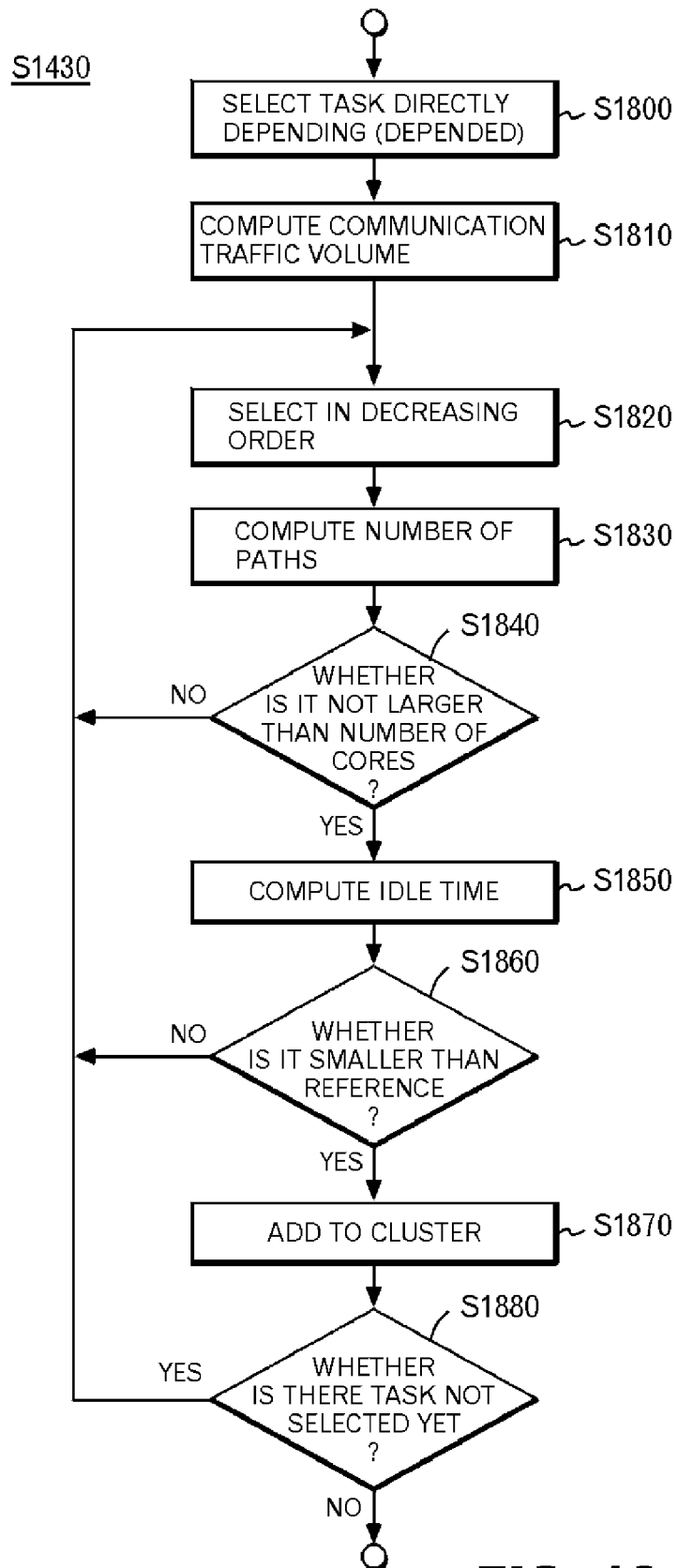
FIG. 18 shows the details of processing in S1430.

FIG. 18 shows the details of processing in S1430. With respect to the dominant path selected in S1420, the candidate selecting section 1320 selects, as a candidate task, a task which directly depends on any of the tasks included in the dominant path, or a task on which any of the tasks included in the dominant path directly depends (S1800). Then, with respect to each of the candidate tasks, the communication traffic volume computing section 1350 computes a sum of communication traffic volumes in which the candidate task communicates with each of the multiple tasks in the cluster including the dominant path (S1810).

The candidate selecting section 1320 selects the candidate tasks one by one among from these candidate tasks in descending order of the sum of the computed communication traffic volumes (S1820). In a case where the candidate task is included in a cluster together with the dominant path, the path number computing section 1330 computes the total number of dominant paths included in the cluster (S1830). The task adding section 1340 determines whether the total number of computed dominant paths is not larger than the number of the execution cores (S1840).

When the total number of the computed dominant paths is not larger than the number of the execution cores (S1840: YES), the idle rate computing section 1360 computes a time rate at which the processor is in an idle state when the tasks in the cluster are executed by the processor cores with the number equal to the number of the execution cores, in the case where the candidate task is included in the cluster together with the dominant paths (S1850). On condition that the time rate at which the processor is in an idle state is equal to or smaller than a predetermined reference value (S1860: YES), the task adding section 1340 generates a cluster including the candidate task in the dominant path (S1870).

Then, when there exists a task, which is not included in any of the clusters (S1880: YES), the candidate selecting section 1320 returns processing to S1820 and selects a next task. When there exists no such a task, (S1880: NO), the candidate selecting section 1320 ends the processing in this figure. On the other hand, when the total number of computed dominant paths is larger than the number of the execution cores (S1840: NO) or the idle time rate is equal to or larger than the reference value (S1860: NO), the candidate selecting section 1320 determines that the candidate task is not included in the cluster and ends the processing in this figure.

Figure 19:
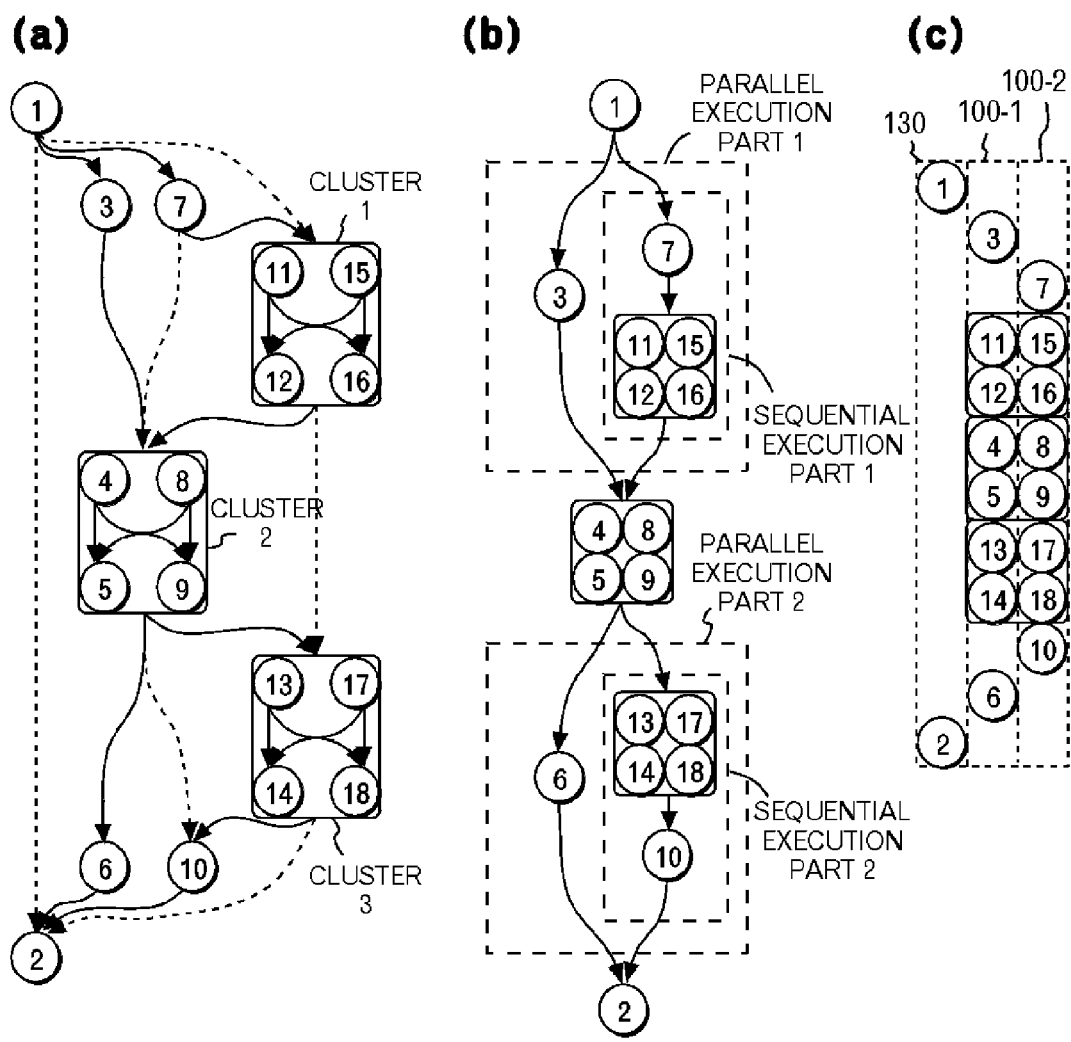
FIG. 19 shows a series-parallel graph that defines a dependency relation among clusters together with scheduling results of tasks included therein.

(3) Selection of the Number of Processor Cores:

Sequentially, an explanation will be given of processing for selecting the number of processor cores to be assigned for execution of each of the clusters using a target program, which is different from that shown in FIG. 4, as an example. FIG. 19 shows a series-parallel graph that defines dependency relations among the clusters together with the scheduling results of the tasks included therein. FIG. 19A shows the clusters generated by the cluster generating section 515 together with the dependency relations among the clusters. More specifically, the cluster associated processing unit 510 selects tasks 11, 12, 15, and 16 to generate one cluster. This is assumed to be cluster 1.

Moreover, the cluster associated processing unit 510 selects tasks 4, 5, 7, and 9 to generate one cluster. This is assumed to be cluster 2. Furthermore, the cluster associated processing unit 510 selects tasks 13, 14, 17, and 18 to generate one cluster. This is assumed to be cluster 3. Still furthermore, the cluster associated processing unit 510 selects each of tasks 3, 7, 6, and 10 as a cluster that is composed of only the task, itself.

The cluster generating section 515 combines two or more clusters, which can be executed in a sequential manner or in parallel, into a cluster group of an upper-level hierarchy of clusters, and combines the two or more cluster groups, which can be executed in a sequential manner or in parallel, into a cluster group of a further upper-level hierarchy. For example, as a result of analyzing the dependency relations among the clusters, the cluster composed with only the task 7 has a dependency path on the cluster 1. Accordingly, as shown in FIG. 19B, these clusters form the cluster group of the upper-level hierarchy of these clusters. This cluster group is called as a sequential execution part of the series-parallel graph. The cluster group, which is composed of the task 7 and the cluster 1, is assumed to be a sequential execution part 1.

Furthermore, the cluster generating section 515 forms two or more clusters, which can be executed in a sequential manner or in parallel, as a cluster group of an upper-level hierarchy of the clusters, and forms the two or more cluster groups, which can be executed in a sequential manner or in parallel, as a cluster group of a further upper-level hierarchy. For example, the cluster composed of only the task 3 has no dependency path on the sequential execution part 1. Accordingly, this cluster and the cluster group composed of the sequential execution part 1 form the cluster group of the upper-level hierarchy of these clusters and the sequential execution part 1. This cluster group is called as a parallel execution part of the series-parallel graph. This parallel execution part is assumed to be a parallel execution part 1. By forming the cluster groups as described above, the cluster generating section 515 generates a series-parallel graph indicating dependency relations in the hierarchized execution order of the multiple clusters.

A similar manner is applied to the other parts, and the cluster 3 and the cluster composed of only task 10 form a sequential execution part 2. Moreover, the sequential execution part 2 and the cluster composed of only task 6 form a parallel execution part 2. Furthermore, the cluster groups in this figure form a sequential execution part as a whole.

Figure 20:
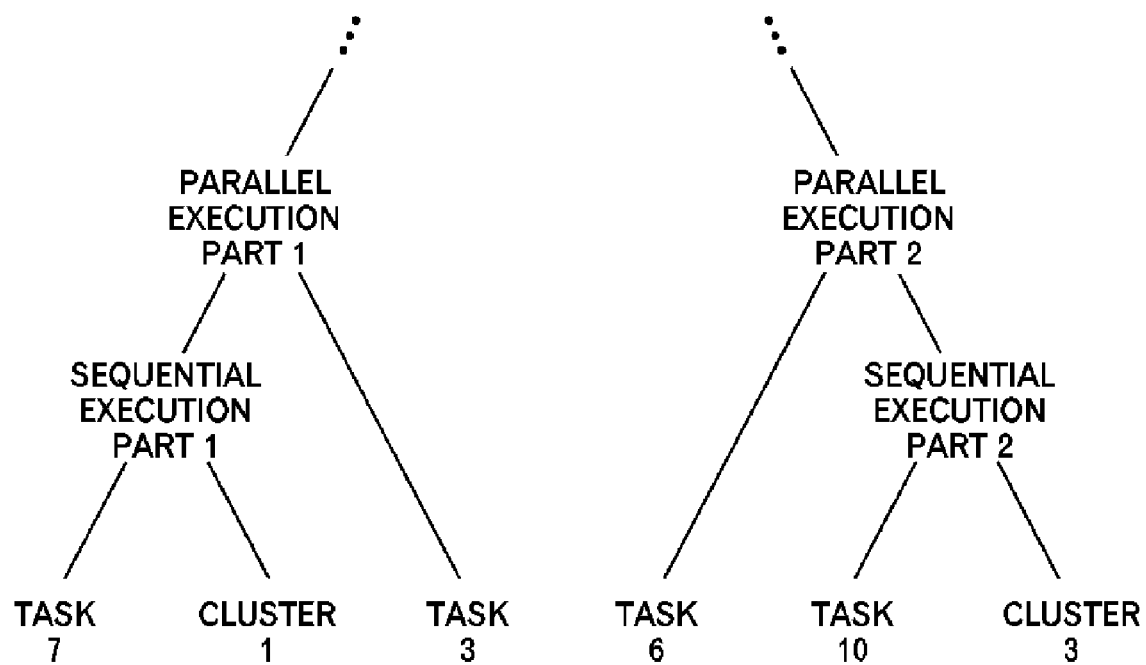
FIG. 20 shows a hierarchical structure of the cluster groups.

FIG. 20 shows a hierarchical structure of the cluster groups. In order to form the hierarchical structure, the cluster generating section 515 may generate a graph by using each of the multiple clusters as a node; and by forming a node indicating a sequential execution part, where the multiple clusters should be sequentially executed, in an upper-level hierarchy of multiple nodes corresponding to the multiple clusters having the dependency relation in the execution order. For example, a node indicating the sequential execution part 1 is formed, in an upper-level hierarchy of a node indicating the task 7 and a node indicating the task 1. Likewise, the cluster generating section 515 may generate a node indicating a parallel execution part, where the multiple clusters can be executed in parallel, in an upper-level hierarchy of the multiple nodes corresponding to the multiple clusters which can be executed in parallel.

Further, the cluster generating section 515 generate a node, which indicates that the multiple parallel execution parts or the sequential execution parts are further sequential execution parts, in the upper-level hierarchy of the multiple nodes corresponding to the multiple parallel execution parts or the sequential execution parts having the dependency relation in the execution order. For example, in the upper-level hierarchy of the node indicating the sequential execution part 1, a node, which indicates the parallel execution part formed together with the task 3, is generated. Likewise, the cluster generating section 515 may generate a node, which indicates that the multiple parallel execution parts or the sequential execution parts are sequential execution parts, in the upper-level hierarchy of the multiple nodes corresponding to the multiple parallel execution parts where parallel execution is possible or the sequential execution parts.

It is noted that the details of the series-parallel graph are explained in the aforementioned non-patent documents.

The description goes back to FIG. 19. The core number selecting unit 530 selects the number of processor cores to be assigned for the execution of each of the clusters by dynamic programming in order to more reduce an execution time of these sequential and parallel execution parts. The partial problems in dynamic programming is the problems in selection of the number of processor cores to be assigned to each of the clusters constituting the part, the sequential execution parts, or the parallel execution parts, in order to optimize an execution time of each of the sequential execution part and the parallel execution part. Then, the core number selecting unit 530 solves each of the partial problems by dynamic programming, thereby selecting the number of processor cores to be assigned to each of the clusters, in order to optimize the execution time of the target program 15.

The partial problems are solved in order from the cluster group of the lowest-level hierarchy as a processing procedure. In other words, in order to reduce the total execution time of the cluster group of the lower-level hierarchy, the core number selecting unit 530 selects the number of processor cores to be assigned to two or more parallel executable clusters or cluster groups, which are positioned in a further lower-level hierarchy than the cluster group of the lower-level hierarchy, in terms of respective one or more of natural numbers selected from the natural numbers not larger than the number of the execution cores.

In the example of this figure, the core number selecting unit 530 computes execution time for which the sequential execution part 1 is executed by one processor core and further computes execution time for which the sequential execution part 1 is executed by two processor cores. The execution time for which the sequential execution part 1 is executed by two processor cores may become shorter than the execution time for which the sequential execution part 1 is executed by one processor core. Moreover, since the maximum degree of parallelism of the sequential execution part 1 is 2, computing the execution times for the execution by two or more processor cores results in the same execution time according to the property of the program.

Next, the core number selecting unit 530 computes an execution time of the parallel execution part 1. When the number of processor cores is 1, the core number selecting unit 530 computes the execution time of the parallel execution part 1 by adding a time, for which the task 3 is executed, to the execution time already obtained for executing the sequential execution part 1 by one processor core. When the number of processor cores is 2 or 3, the core number selecting unit 530 computes the execution time of the parallel execution part 1 by using the execution time already obtained for executing the sequential execution part 1 by one processor core.

For example, when the number of processor cores is 3, the core number selecting unit 530 computes an execution time for executing the sequential execution part 1 by one processor core and the task 3 is executed by two processor cores in parallel therewith. Moreover, the core number selecting unit 530 computes an execution time for executing the sequential execution part 1 by two processor cores and the task 3 by one processor cores in parallel therewith. Then, of these execution times, the core number selecting unit 530 uses the shorter execution time as the execution time for the parallel execution part 1.

The core number selecting unit 530 thus computes the execution time of each part and finally computes the execution time for which the sequential execution part configured with all of the cluster groups is executed by the number of execution cores. In the case where the above execution time is computed, the number of the processor cores assigned to each cluster becomes the number of processor cores to be assigned for the execution of each cluster.

According to the aforementioned embodiment, the compiler 20 can efficiently execute the target program 15 by the multi-core processor. Namely, first, the path associated processing unit 500 detects execution paths with large gains as dominant paths when the tasks are executed by the same processor cores. Second, the cluster associated processing unit 510 selects multiple dominant paths up to the number of dominant paths executable in parallel, and generates clusters to be executed consecutively or in parallel. At this time, communication traffic volume used in communications inside and outside clusters is controlled as small as possible and the dominant path having the cyclic dependency are given less priority for the cluster generation. Accordingly, the core number selecting unit 530 can apply the dynamic programming to schedule the tasks in order that the entire program is efficiently executed.

According to the present invention, in a new processor for a parallel processing such as multi-core processor, a program can be efficiently operated. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A compiler apparatus that optimizes execution of a target program to be compiled using a multi-core processor in which a plurality of processor cores are provided, of which each can perform arithmetic processing independently of and in parallel with other processor cores on a microprocessor chip, the compiler apparatus comprising:
    a memory that stores the target program;
    a recording component that records the number of execution cores that is the number of processor cores for executing the target program among the processor cores included in the multi-core processor;
    a path detecting component that accesses the memory according to an operation of the processor in the compiler apparatus to detect, in the target program, dominant paths that are execution paths showing a flow of process by a first task and a second task, which maximizes an amount of a task switching time between a case where the second task is continuously executed by the same processor core in comparison with a case where the second task is executed by the processor core different from that of the first task, among execution paths showing a flow of process by a plurality of tasks of which each is an instruction group corresponding to a part of a process of the target program, according to the operation of the processor in the complier apparatus, the second task being selected from a plurality of second tasks dependent on a processing result of the first task;
    a cluster generating component that generates, according to the operation of the processor in the compiler apparatus, at least one task to be in parallel or in succession executed by the multi-core processor by selecting the dominant paths not more than the number of execution cores as a cluster on the basis of the number of execution cores recorded on the recording component and stores the result in the memory;
    a time computing component that accesses the memory according to the operation of the processor in the compiler apparatus to compute runtime for which the cluster is executed by the processor cores corresponding to the number of cores with respect to one or each of a plurality of cores necessary to execute the cluster, the number of cores being less than or equal to the number of execution cores, stores every cluster in the memory according to the operation of the processor; and stores the result in the memory; and
    a core number selecting component that accesses the memory according to the operation of the processor in the compiler apparatus to select the number of processor cores to be assigned for the purpose of the execution of each cluster in order to reduce the runtime of the target program on the basis of the runtime stored in the memory according to the operation of the processor in the compiler apparatus and stores the result in the memory.

2. The compiler apparatus as claimed in claim 1, wherein the time computing component accesses the memory according to the operation of the processor in the compiler apparatus to compute runtime for which the cluster is executed by the processor cores corresponding to each core number from one to the number of execution cores every cluster stored in the memory according to the operation of the processor of the compiler apparatus and stores the result in the memory, and the core number selecting component accesses the memory according to the operation of the processor in the compiler apparatus to select the number of processor cores to be assigned for purposes of the execution of each cluster on the basis of the runtime stored in the memory according to the operation of the processor in the complier apparatus and stores the result in the memory.

3. The compiler apparatus as claimed in claim 1, wherein the cluster generating component considers the two or more clusters capable of being executed sequentially or in parallel as a higher-order hierarchic cluster group than the cluster and the two or more cluster groups capable of being executed sequentially or in parallel as a further higher-order hierarchic cluster group on the basis of the number of execution cores recorded on the recording component, in order to generate a series parallel graph showing a dependency relation of hierarchized execution order on the plurality of clusters according to the operation of the processor in the complier apparatus and stores the result in the memory, and the core number selecting component accesses the memory according to the operation of the processor in the complier apparatus to compute runtime for which a low-order hierarchic cluster group is executed by the processor cores corresponding to the number of cores for each of one or the plurality of cores selected from natural number less than or equal to the number of processor cores in sequence from the low-order hierarchic cluster group on the basis of the runtime stored in the memory according to the operation of the processor in the complier apparatus, selects the number of processor cores to be assigned to the two or more clusters or the cluster group, capable of being concurrently executed, located at a further lower-order hierarchy than the low-order hierarchic cluster group and thus selects the number of processor cores to be assigned to each of the clusters in order to reduce runtime of the low-order hierarchic cluster group on the basis of the computed runtime, and stores the result in the memory.

4. The compiler apparatus as claimed in claim 1, wherein the cluster generating unit considers, on the basis of the number of execution cores recorded on the recording component, each of the plurality of clusters as a node, generates a node showing that the plurality of clusters is a sequential execution part to be sequentially executed on a high-order hierarchy of a plurality of nodes corresponding to the plurality of clusters of which execution order has a dependency relation according to the operation of the processor in the complier apparatus, and generates a node showing that the plurality of clusters is a parallel execution part capable of being executed in parallel on a high-order hierarchy of the plurality of nodes corresponding to the plurality of clusters capable of being executed in parallel according to the operation of the processor in the complier apparatus, the cluster generating unit further generates a node showing that a plurality of parallel execution parts or sequential execution parts is further a sequential execution part on a high-order hierarchy of the plurality of nodes corresponding to the plurality of parallel execution parts or sequential execution parts of which execution order has a dependency relation according to the operation of the processor in the complier apparatus, or generates a node showing that the plurality of parallel execution parts or sequential execution parts is further a parallel execution part on a high-order hierarchy of the plurality of nodes corresponding to the plurality of parallel execution parts or sequential execution parts capable of being executed in parallel according to the operation of the processor in the complier apparatus, in order to generate a series parallel graph according to the operation of the processor in the complier apparatus, and stores the result in the memory, and the core number selecting component accesses the memory according to the operation of the processor in the complier apparatus to consider, as a sub-problem, a problem to select the number of processor cores to be assigned to each of the cluster, the sequential execution part, and the parallel execution part constituting the part to optimize runtime of each of the sequential execution part and the parallel execution part on the basis of the runtime stored in the memory and solve each sub-problem by means of dynamic programming, selects the number of processor cores to be assigned to each cluster to optimize the runtime of the target program according to the operation of the processor in the complier apparatus, and stores the result in the memory.

5. The compiler apparatus as claimed in claim 1, wherein the compiler apparatus further comprises a circular nature dependency detecting component that accesses, for each of the detected dominant paths, the memory according to the operation of the processor in the complier apparatus, in order to detect circular nature dependency by which any task on the dominant path is further dependent on a process of a task on another execution path dependent on a process of the other task on the dominant path in the target program according to the operation of the processor in the complier apparatus, and the cluster generating component selects a dominant path having the smallest detected circular nature dependency in priority to the other dominant paths according to the operation of the processor in the complier apparatus, generates a cluster including the selected dominant path and other tasks according to the operation of the processor in the complier apparatus, and stores the result in the memory.

6. The compiler apparatus as claimed in claim 5, wherein the compiler apparatus further comprises an adjacent path selecting component that accesses, for each of the dominant paths, the memory according to the operation of the processor in the complier apparatus in order to select an adjacent path that is another dominant path including a task that directly transfers data to either task on the dominant path in the target program according to the operation of the processor in the complier apparatus, and the cluster generating component selects, on condition that the number of the detected circular nature dependency is equal for each dominant path, a dominant path of which the number of adjacent paths is smallest in priority to the other dominant paths according to the operation of the processor in the complier apparatus, generates a cluster including the selected dominant path and other tasks according to the operation of the processor in the complier apparatus, and stores the result in the memory.

7. The compiler apparatus as claimed in claim 1, wherein the cluster generating component comprises:

a candidate selecting component that selects, for at least the one dominant path, a candidate task that is a candidate of task to be included in a cluster along with the dominant path according to the operation of the processor in the complier apparatus;

a pass number computing component that computes the total number of dominant paths included in the cluster according to the operation of the processor in the complier apparatus when including the candidate task in the cluster along with this dominant path; and a task adding component that generates the cluster including the candidate task on the basis of the number of execution cores recorded on the recording component on condition that the total number of the computed dominant paths is not more than the number of execution cores according to the operation of the processor in the complier apparatus and stores the result in the memory, and the candidate selecting component selects further another task as another candidate task to be included in the cluster on condition that the candidate task has been added in the cluster according to the operation of the processor in the complier apparatus.

8. The compiler apparatus as claimed in claim 7, wherein the compiler apparatus further comprises a communications traffic computing component that accesses the memory according to the operation of the processor in the complier apparatus in order to compute a sum of communication traffic by which the selected candidate task communicates with each of the plurality of tasks in the cluster on the basis of the target program according to the operation of the processor in the complier apparatus, and the task adding component generates the task including the selected candidate task on condition that the sum of the communication traffic is larger than a predetermined reference value according to the operation of the processor in the complier apparatus cluster.

9. The compiler apparatus as claimed in claim 7, wherein the compiler apparatus further comprises an idle ratio computing component that accesses the memory according to the operation of the processor in the complier apparatus in order to compute, on the basis of the target program, a ratio of time by which the multi-core processor becomes an idle state in case that the task in the cluster is executed by the processor cores of which the number is the number of the execution cores and in case that the selected candidate task is included in the cluster along with this dominant path, according to the operation of the processor in the complier apparatus, and the task adding component generates the cluster including the selected candidate task on further condition that the ratio of time is smaller than the predetermined reference value according to the operation of the processor in the complier apparatus and stores the result in the memory.

10. The compiler apparatus as claimed in claim 1, wherein the time computing component accesses the memory according to the operation of the processor in the complier apparatus in order to compute, every cluster stored on the memory, the runtime of this cluster by estimating the maximum necessary time when switching the task from the cluster inside to the cluster outside or when switching the task from the cluster outside to the cluster inside according to the operation of the processor in the complier apparatus and stores the result in the memory.

11. The compiler apparatus as claimed in claim 1, wherein the compiler apparatus further comprises:
a task selecting component that accesses the memory according to the operation of the processor in the complier apparatus in order to select, for a first task in the target program stored in the memory, at least one second task dependent on a processing result of the first task according to the operation of the processor in the complier apparatus; and
a reduced amount computing component that computes a reduced amount of the task switching time that is reduced when the second task is executed by the same processor core next to the first task, in comparison to a task switching time when the first task and the selected second task are executed by a different processor core, according to the operation of the processor in the complier apparatus and stores the result in the memory, and
wherein the path detecting component detects, on the basis of the reduced amount stored in the memory, the second task in which the reduced amount becomes the maximum along with the first task including them in the dominant path according to the operation of the processor in the complier apparatus.

12. A compiling method for optimizing, by a compiler, execution of a target program to be compiled using a multi-core processor in which a plurality of processor cores is provided, of which each can perform arithmetic processing independently of and in parallel with other processor cores on a microprocessor chip,
the compiler comprising a recording component that records the number of execution cores that is the number of processor cores for executing the target program among the processor cores included in the multi-core processor, and a memory that stores the target program,
the compiling method comprising:
accessing, by the processor, the memory to detect, in the target program, dominant paths that are execution paths showing a flow of process by a first task and a second task, which maximizes an amount of a task switching time between a case where the second task is continuously executed by the same processor core in comparison with a case where the second task is executed by the processor core different from that of the first task, among execution paths showing a flow of process by a plurality of tasks of which each is an instruction group corresponding to a part of a process of the target program, the second task being selected from a plurality of second tasks dependent on a processing result of the first task;
generating, by the processor, at least one task to be in parallel or in succession executed by the multi-core processor by selecting the dominant paths not more than the number of execution cores as a cluster on the basis of the number of execution cores recorded on the recording component and storing the result in the memory;
accessing, by the processor, the memory to compute runtime for which the cluster is executed by the processor cores corresponding to the number of cores with respect to each of one or a plurality of cores necessary to execute the cluster, in which the each has the core(s) less than or equal to the number of execution cores, and storing every cluster and runtime in the memory; and
accessing, by the processor, the memory to select the number of processor cores to be assigned for the purpose of the execution of each cluster in order to reduce the runtime of the target program on the basis of the runtime stored in the memory, and storing the result in the memory.

13. A compiling program embodied in computer memory making an information processing system function as a compiler apparatus that optimizes execution of a target program to be compiled using a multi-core processor in which a plurality of processor cores is provided, of which each can perform arithmetic processing independently of and in parallel with other processor cores on a microprocessor chip, the compiling program making the information processing system function as:
a memory that stores the target program;
a recording component that records the number of execution cores that is the number of processor cores for executing the target program among the processor cores included in the multi-core processor;
a path detecting component that accesses the memory according to an operation of the processor in the complier apparatus to detect, in the target program, dominant paths that are execution paths showing a flow of process by a first task and a second task, which maximizes an amount of a task switching time between a case where the second task is continuously executed by the same processor core in comparison with a case where the second task is executed by the processor core different from that of the first task, among execution paths showing a flow of process by a plurality of tasks of which each is an instruction group corresponding to a part of a process of the target program, according to the operation of the processor in the complier apparatus, the second task being selected from a plurality of second tasks dependent on a processing result of the first task;
a cluster generating component that generates, according to the operation of the processor in the complier apparatus, at least one task to be in parallel or in succession executed by the multi-core processor by selecting the dominant paths not more than the number of execution cores as a cluster on the basis of the number of execution cores recorded on the recording component and stores the cluster on the memory;
a time computing component that accesses the memory according to the operation of the processor in the complier apparatus to compute runtime for which the cluster is executed by the processor cores corresponding to the number of cores with respect to each of one or a plurality of cores necessary to execute the cluster, in which the each has the core(s) less than or equal to the number of execution cores, every the cluster stored in the memory according to the operation of the processor in the complier apparatus and stores the runtime in the memory; and
a core number selecting component that accesses the memory according to the operation of the processor in the complier apparatus to select the number of processor cores to be assigned for the purpose of the execution of each cluster in order to reduce the runtime of the target program on the basis of the runtime stored in the memory according to the operation of the processor in the complier apparatus and stores the number of processor cores in the memory.

* * * * *